(12) United States Patent
Matsuura

(10) Patent No.: US 7,132,818 B2
(45) Date of Patent: Nov. 7, 2006

(54) SWITCHING POWER SUPPLY CONTROL DEVICE AND SWITCHING POWER SUPPLY

(75) Inventor: Ken Matsuura, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/258,002

(22) Filed: Oct. 26, 2005

(65) Prior Publication Data

US 2006/0091872 A1   May 4, 2006

(30) Foreign Application Priority Data

Oct. 28, 2004 (JP) ............................ P2004-314492
Oct. 14, 2005 (JP) ............................ P2005-299959

(51) Int. Cl.
*G05F 1/10* (2006.01)
*G05F 1/652* (2006.01)

(52) U.S. Cl. .................... 323/222; 323/224; 323/284

(58) Field of Classification Search ................ 323/222, 323/282, 284, 285, 223, 224
See application file for complete search history.

(56) References Cited

U.S. PATENT DOCUMENTS

| | | | |
|---|---|---|---|
| 5,867,379 A * | 2/1999 | Maksimovic et al. ......... | 363/89 |
| 6,222,746 B1 * | 4/2001 | Kim ............................. | 363/89 |
| 6,259,613 B1 * | 7/2001 | Lee et al. ..................... | 363/89 |
| 6,650,092 B1 * | 11/2003 | Lidak et al. ................. | 323/207 |
| 6,657,417 B1 * | 12/2003 | Hwang ........................ | 323/222 |
| 6,683,441 B1 * | 1/2004 | Schiff et al. ................. | 323/222 |
| 6,737,845 B1 * | 5/2004 | Hwang ........................ | 323/284 |
| 6,903,535 B1 * | 6/2005 | Liu et al. ..................... | 323/222 |
| 6,906,499 B1 * | 6/2005 | Hussein et al. ............. | 323/222 |

FOREIGN PATENT DOCUMENTS

JP     A 2005-176547     6/2005

OTHER PUBLICATIONS

"An Accurate and Practical Small-Signal Model for Current-Mode Control," RidleyEngineering, pp. 1-22, 1999.
Data Sheet of HIP6301 PWM controller, pp. 1-18.

* cited by examiner

*Primary Examiner*—Bao Q. Vu
(74) *Attorney, Agent, or Firm*—Oliff & Berridge, PLC

(57) ABSTRACT

A switching power supply comprises a switching device, a smoothing circuit, and a control circuit including a current detector for detecting a current flowing through an inductor in the smoothing circuit. The detected current is multiplied by a current control gain to generate a signal PIS. The rectangular wave signal is add to and the signal PIS is subtracted from a voltage detection signal corresponding to the output voltage of the switching power supply. The current control gain is adjusted so that ΔPIS/ΔD becomes closer to a predetermined constant, where ΔPIS represents an amount of change in the signal PIS, and ΔD an amount of change in the duty ratio of a driving signal for the switching device.

13 Claims, 13 Drawing Sheets

| $\frac{1}{2\alpha}$ D_A | PIS_A | $\frac{1}{2\alpha}$ D_B | PIS_B | MAGNITUDE RELATIONSHIP | Kamp | |
|---|---|---|---|---|---|---|
| large | small | small | large | = | stable | ─ 101 |
| large | small | small | small | > | up | ─ 102 |
| large | small | small | extra large | < | down | ─ 103 |
| small | large | large | small | = | stable | ─ 104 |
| small | small | large | small | < | up | ─ 105 |
| small | extra large | large | small | > | down | ─ 106 |

US 7,132,818 B2

SWITCHING POWER SUPPLY CONTROL DEVICE AND SWITCHING POWER SUPPLY

BACKGROUND OF THE INVENTION

1. Field of the Invention

The present invention relates to a switching power supply control device and a switching power supply which perform a phase-lead compensation.

2. Related Background Art

Switching power supplies, which have such characteristic features as small size, light weight, and high efficiency, have widely been utilized as power sources for microcomputers built in various devices, personal computers, and the like. The personal computers and the like have been achieving a lower voltage and a higher processing speed while increasing their current consumption. Therefore, the switching power supplies may drastically increase or decrease their load current in response to the processing load in the personal computers and the like. The switching power supplies also have a characteristic feature in that they can easily conform to a wide input voltage range, and thus have been utilized as a power source usable in several countries in the world and a power source having a wide specification for setting their input voltage. It is necessary for the switching power supplies to secure a stable output voltage against such a change in load current and input voltage. Even when the output voltage becomes a transient response to a drastic change in load current or in input voltage, the switching power supplies are required to restore a stable state rapidly.

In particular, a high-speed response is required in switching power supplies for driving microprocessors such as VRM (Voltage Regulator Module) and POL (Point of Load) and LSI (Large Scale Integration) having a high clock frequency and a low voltage such as DSP (Digital Signal Processor) in order to respond to drastic fluctuations in load current. However, in a switching power supply equipped with an LC filter circuit as an output circuit, a phase delay occurs therein due to the influence of the LC filter circuit.

A switching power supply may have a control device such as a controller IC (Integrated Circuit), which turns on/off a switching device such as FET (Field Effect Transistor). The control device feeds back the output voltage of the switching power supply, so as to construct a voltage loop, and generates a PWM (Pulse Width Modulation) signal for turning on/off the switching device according to the output voltage. "An Accurate and Practical Small-Signal Model for Current-Mode Control," Ridley Engineering inc., 1999 discloses the control device that feeds back the current flowing through an inductor of the LC filter circuit, so as to construct a current loop, thus performing a phase-lead compensation under current mode control using the current flowing through the inductor. In the current loop, a value resulting from multiplication of a detected current by a current control gain is fed back. The above document discloses that the current control gain has the optimal value. Data Sheet of HIP6301 PWM controller, intersil corporation, 2002, discloses that the current flowing through the inductor is detected according to a voltage across the resistance, Ron, of the switching device when the switching device is turned on.

SUMMARY OF THE INVENTION

When detecting the current using the resistance Ron, however, Ron affects the current loop gain. If variation as a device fluctuation with temperature, and the like exist in the resistance Ron, the current loop gain changes from the optimal value, whereby the control system becomes unstable. As a result, the output voltage can vary so greatly as to oscillate. When the current loop gain is high, the gain margin becomes insufficient in a hi-frequency region, so that the control of the output voltage becomes unstable. When the current loop gain is low, on the other hand, the phase margin becomes insufficient in the high-frequency region, so that the phase-lead effect lowers, whereby the control of the output voltage becomes unstable.

In view of the above, it is an object of the present invention to provide a switching power supply control device and a switching power supply which optimize the current loop gain.

In one aspect, the invention relates to a control device for controlling a switching power supply having an output voltage. The switching power supply includes a switching device which switches at a predetermined switching period and a predetermined switching frequency to produce an output, and a smoothing circuit for smoothing the output of the switching device. The smoothing circuit includes an inductor connected to the switching device. The control device comprises: a voltage detector for detecting the output voltage of the switching power supply to generate a voltage detection signal corresponding to the output voltage; a current detector for detecting a current flowing through the inductor for each switching period to generate a current detection signal corresponding to the detected current; a rectangular wave generator for generating a rectangular wave signal having a frequency of half the switching frequency; a multiplier for multiplying the current detection signal by a current control gain to generate a gain-multiplied current detection signal; a calculator for adding the rectangular wave signal and subtracting the gain-multiplied current detection signal to/from the voltage detection signal to generate a control signal having a magnitude; a driving signal generator for generating a driving pulse signal having a duty ratio corresponding to the magnitude of the control signal and supplying the driving pulse signal to the switching device to drive the switching device; the driving pulse signal being generated so that $\Delta D/\Delta CS$ equals $\alpha$, where $\Delta D$ represents an amount of change in the duty ratio for each switching period, and $\Delta CS$ an amount of change in the control signal for each switching period, and $\alpha$ is a constant, and a gain adjustor for adjusting the current control gain according to the gain-multiplied current detection signal and the duty ratio, the current control gain being adjusted so that $\Delta PIS/\Delta D = -\frac{1}{2}\alpha$ is satisfied, where $\Delta PIS$ represents an amount of change in the gain-multiplied current detection signal for each switching period.

In another aspect, the invention relates to a control device adapted to be connected to a smoothing circuit to configure a switching power supply having an output voltage. The smoothing circuit includes an inductor. The control device comprises: a switching device which switches at a predetermined switching period and a predetermined switching frequency, the switching device being adapted to be connected to the inductor; a voltage detector for detecting the output voltage of the a rectangular wave generator for generating a rectangular wave signal having a frequency of half the switching frequency; a multiplier for multiplying the current detection signal by a current control gain to generate a gain-multiplied current detection signal; a calculator for adding the rectangular wave signal and subtracting the gain-multiplied current detection signal to/from the voltage detection signal to generate a control signal having a magnitude; a driving signal generator for generating a driving pulse signal having a duty ratio corresponding to the magnitude of the control signal and supplying the driving pulse signal to the switching device to drive the switching device; the driving pulse signal being generated so that $\Delta D/\Delta CS$ equals $\alpha$, where $\Delta D$ represents an amount of change in the duty ratio for each switching period, and $\Delta CS$ an amount of change in the control signal for each switching period, and $\alpha$ is a constant, and a gain adjustor for adjusting the current control gain according to the gain-multiplied current detection signal and the duty ratio, the current control gain being adjusted so that $\Delta PIS/\Delta D=-\frac{1}{2}\alpha$ is satisfied, where $\Delta PIS$ represents an amount of change in the gain-multiplied current detection signal for each switching period.

The driving pulse signal is a signal for turning on/off the switching device in the switching power supply, and is a PWM signal, for example. The voltage detection signal corresponding to the output voltage of the switching power supply is a signal for performing feedback control based on the output voltage, and is a signal obtained by differentially amplifying the detected output voltage and a target voltage, for example. The duty ratio of the driving pulse signal is the proportion of the time period during which the switching device is turned on in one period of the driving pulse signal, that is, the proportion of the ON time in one period of the switching operation. For the adjustment of the current control gain, the duty ratio of the driving pulse signal may be directly used, or other parameters reflecting the duty ratio, such as the pulse width of the driving pulse signal, may be used.

The switching device may have a resistance when being turned on, and the current detector may detect the current flowing through the inductor by detecting a voltage across the resistance.

The gain-multiplied current detection signal may alternately rise and fall at intervals of the switching period, and the duty ratio may decrease in synchronization with the rising of the gain-multiplied current detection signal, and increase in synchronization with the falling of the gain-multiplied current detection signal.

The driving signal generator may include a ramp signal generator for generating a ramp signal which oscillates at a predetermined amplitude and the switching frequency, and the constant a may equal a reciprocal of the amplitude of the amp signal.

The rectangular wave signal may have a high level term and a low level term. The gain adjuster may includes: a first calculator for calculating $(\frac{1}{2}\alpha)\cdot D\_A+PIS\_A$, where D_A represents the duty ratio in the high level term of the rectangular wave signal, and PIS_A a magnitude of the gain-multiplied current detection signal in the high level term of the rectangular wave signal, to generate a first result signal indicating a result of the calculation; a second calculator for calculating $(\frac{1}{2}\alpha)\cdot D\_B+PIS\_B$, where D_B represents the duty ratio in the low level term of the rectangular wave signal, and PIS_B a magnitude of the gain-multiplied current detection signal in the low level term of the rectangular wave signal, to generate a second result signal indicating a result of the calculation; a first comparator for comparing the first result signal with the second result signal to generate a first comparison signal indicating a result of the comparison; a duty ratio detector for detecting D_A and D_B from the driving pulse signal; a second comparator for comparing the detected D_A with the detected D_B to generate a second comparison signal indicating a result of the comparison; and a gain determining circuit for increasing or decreasing the current control gain, depending on the first and second comparison signals, to determine the current control gain.

The gain-multiplied current detection signal may be an analog signal. The gain adjuster may include: an analog-to-digital converter for converting the gain-multiplied current detection signal into a digital gain-multiplied signal; a first digital detector for detecting $\Delta PIS$ from the digital gain-multiplied signal; a second digital detector for detecting $\Delta D$ from the driving pulse signal; a digital divider for calculating $\Delta PIS/\Delta D$ from the detected $\Delta PIS$ and the detected $\Delta D$; a digital comparator for comparing the calculated $\Delta PIS/\Delta D$ with $-\frac{1}{2}\alpha$ to generate an output signal indicating a result of the comparison; a digital gain determining circuit for increasing or decreasing the current control gain according to the output signal of the digital comparator so that $\Delta PIS/\Delta D$ becomes closer to $-\frac{1}{2}\alpha$ and generating a digital gain signal indicating the increased or decreased current control gain; and a digital-to-analog converter for converting the digital gain signal into an analog gain signal. The multiplier may receive the analog gain signal and the current detection signal to generate an output signal corresponding to a product of the analog gain signal and the current detection signal as the gain-multiplied current detection signal.

In still another aspect, the invention relates to a switching power supply having an output voltage. The switching power supply comprises a switching device which switches at a predetermined switching period and a predetermined switching frequency to produce an output; a smoothing circuit for smoothing the output of the switching device to generate the output voltage of the switching power supply; and a control circuit for controlling the switching of the switching device. The smoothing circuit includes an inductor connected to the switching device. The control device comprises the voltage detector, the current detector, the rectangular wave generator, the multiplier, the calculator, the driving signal generator, and the gain adjustor, which are mentioned above.

The present invention will become more filly understood from the detailed description given hereinbelow and the accompanying drawings which are given by way of illustration only, and thus are not to be considered as limiting the present invention.

BRIEF DESCRIPTION OF THE DRAWINGS

FIG. 11 is a table showing the magnitude relationship between the left-hand and right-hand sides of expression (17) and up/down of the current control gain;

DESCRIPTION OF THE PREFERRED EMBODIMENTS

Figure 1:
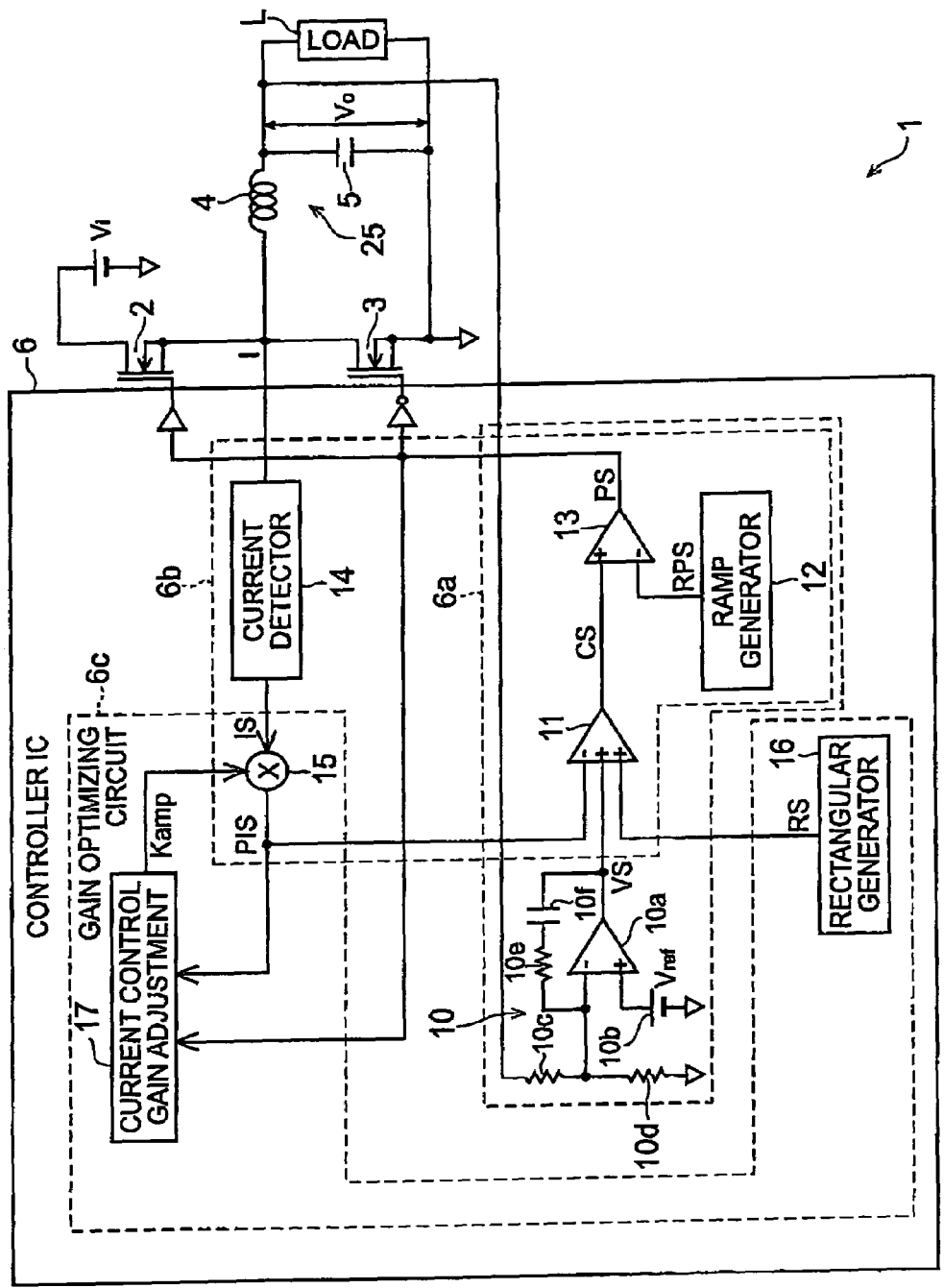
FIG. 1 is a diagram of the DC/DC converter in accordance with the first embodiment.

The preferred embodiments of the present invention will be described below in greater detail with reference to the accompanying drawings. To facilitate understanding, identical reference numerals are used, where possible, to designate identical or equivalent elements that are common to the embodiments, and, in subsequent embodiments, these elements will not be further explained.

First Embodiment

In this embodiment, the switching power supply in accordance with the present invention is applied to a buck type DC/DC converter, whereas the switching power supply control device in accordance with the present invention is applied to a controller IC which generates a PWM signal for controlling a switching device of the DC/DC converter. The controller IC in accordance with this embodiment performs a phase-lead compensation by current mode control.

With reference to FIG. 1, the configuration of a DC/DC converter 1 will be explained. FIG. 1 is a diagram showing the DC/DC converter.

The DC/DC converter 1 is a power supply circuit for converting a DC input voltage Vi into a DC output voltage Vo (<Vi), and can be used for various purposes, e.g., as VRM and POL. The DC/DC converter 1 is also a switching regulator which turns on/off the switching device under PWM control. The input voltage Vi is variable, for which an input voltage range (e.g., 5 to 12 V) is set. For the output voltage Vo, a predetermined target voltage (e.g., 1 V) is set according to a load L. The load L corresponds to CPU, MPU, and DSP in computers and communication devices such as routers, for example, operates at a high clock frequency (e.g., several GHz), and greatly fluctuates the load current depending on the processing load.

The DC/DC converter 1 mainly comprises a high-side FET 2 and a low-side FET 3 which serve as switching devices, an inductor 4, a capacitor 5, and a controller IC 6. The high-side FET 2 is turned on when a pulse width modulation (PWM) signal PS from the controller IC 6 is a high signal. On the other hand, the PWM signal PS is inverted before entering the low-side FET 3. Therefore, when PWM signal PS is a low signal, a high signal enters the low-side FET 3 and turns it on. The inductor 4 and capacitor 5 constitute an LC filter circuit which serves as a smoothing circuit 25. Switching action of the FETs 2, 3 provides the smoothing circuit 25 with a pulsed voltage whose amplitude equals that of the input voltage Vi, and the smoothing circuit 25 averages the pulsed voltage. The controller IC 6 generates a PWM signal under current mode control according to the output voltage Vo and a current I flowing through the inductor 4, in order for the output voltage Vo to attain a target voltage, thereby regulating the state (i.e., ON or OFF state) of the FETs 2, 3.

Figure 2:
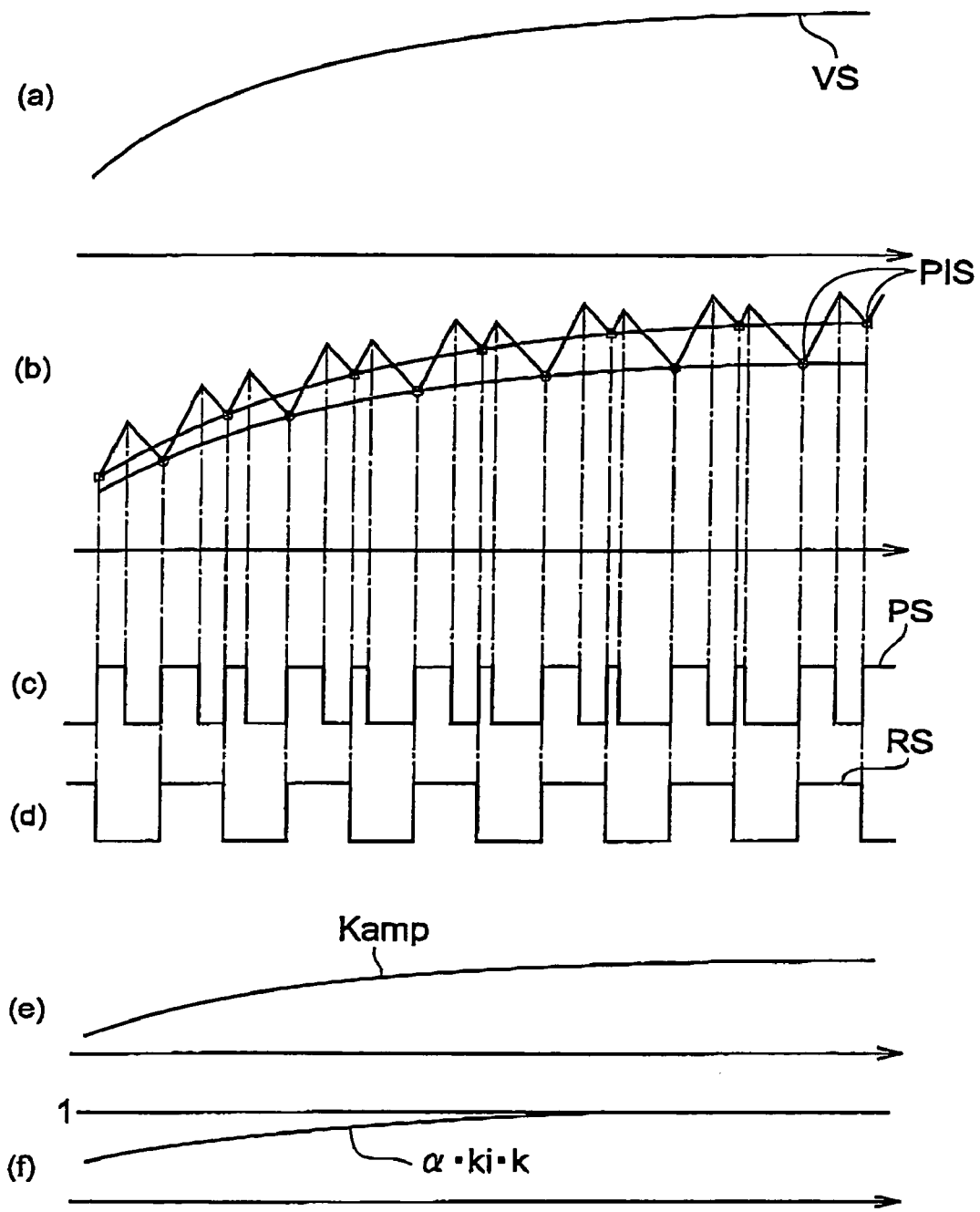
FIG. 2 is a timing chart for a controller IC shown in FIG. 1, where (a) shows a voltage signal from a differential amplifier circuit, (b) a gain-multiplied current detection signal from a multiplier, (c) a PWM signal from a comparator, (d) a rectangular wave signal from the rectangular wave generator circuit, (e) a current control gain from the current control gain adjustment circuit, and (f) a gain of a current loop circuit.

With reference to FIG. 2 as well as FIG. 1, the controller IC 6 will be explained in detail. FIG. 2 is a timing chart for explaining the operation of the controller IC 6, where (a) shows a voltage signal from a differential amplifier circuit, (b) a gain-multiplied current detection signal from a multiplier, (c) a PWM signal from a comparator, (d) a rectangular wave signal from the rectangular wave generator circuit, (e) a current control gain determined by the current control gain adjustment circuit, and (f) a gain of a current loop circuit.

The controller IC 6 mainly comprises a differential amplifier circuit 10, an adder 11, a ramp signal generator circuit 12, a comparator 13, a current detection circuit 14, a multiplier 15, a rectangular wave generator circuit 16, and a current control gain adjustment circuit 17. These components constitute a voltage loop circuit 6a, a current loop circuit 6b, and a gain optimizing circuit 6c. To the voltage loop circuit 6a, the output voltage Vo is fed back. The voltage loop circuit 6a generates a PWM signal PS according to the output voltage Vo. To the current loop circuit 6b, the current I flowing through the inductor 4 is fed back. The current loop circuit 6b performs a phase-lead compensation using the current I. The gain optimizing circuit 6c automatically adjusts the current control gain to set the current loop gain at an optimal value (=1, in this embodiment).

The differential amplifier circuit 10 is a circuit for detecting the output voltage Vo of the switching power supply 1, and includes a differential amplifier 10a, a DC voltage source 10b, resistances 10c to 10e, and a capacitor 10f. The DC voltage source 10b is connected to the non-inverted input terminal of the differential amplifier 10a, and feeds a target voltage Vref to this terminal. The resistor 10c has one end for receiving the output voltage Vo, and the other end connected to one end of the resistor 10d. The other end of the resistor 10d is grounded. The inverted input terminal of the differential amplifier 10a is connected to a node between the resistors 10c and 10d, so that a voltage which results from dividing the output voltage Vo by the resistors 10c and 10d is fed into the inverted input terminal. The output terminal of the differential amplifier 10a is connected to the inverted input terminal by way of the resistor 10c and capacitor 10f connected in series to the output terminal. The differential amplifier circuit 10 amplifies the differential voltage between the output voltage Vo and target voltage Vref by a predetermined factor, and outputs thus obtained signal VS (see FIG. 2(a)). The signal VS reflects the output voltage Vo. In the following, VS will be referred to as a voltage detection signal. The amplification in the differential amplifier circuit 10 is proportional amplification represented as (resistance of resistor 10e)/(resistance of resistor 10c) in a high-frequency region, and integral amplification represented as $1/[j\omega \cdot (\text{capacitance of capacitor } 10f) \cdot (\text{resistance of resistor } 10c)]$ in a low-frequency region.

Fed into the adder 11 are the voltage detection signal VS from the differential amplifier circuit 10, a rectangular wave signal RS from the rectangular wave generator circuit 16, and a gain-multiplied current detection signal PIS from the multiplier 15. The adder 11 adds the rectangular wave signal RS and an inverted signal of the gain-multiplied current detection signal PIS to the voltage detection signal VS to generate a control signal CS.

The ramp signal generator circuit 12 generates a rap signal RPS. The level (magnitude) of the ramp signal RPS is reset to 0 V in response to the rising of the ON signal of the PWM signal PS, and increases at a predetermined ratio from 0 V. The amplitude of the ramp signal RPS is 1 V, for example.

Comparator 13 is a driving signal generator for generating the PWM signal used for driving FETs 2, 3. The control signal CS from the adder 11 is fed into the non-inverted input terminal of the comparator 13, whereas the ramp signal RPS from the ramp signal generator circuit 12 is fed into the inverted input terminal thereof. The comparator 13 compares the ramp signal RPS with the control signal CS, and outputs a high signal when the ramp signal RPS is no greater than the control signal CS, and outputs a low signal when the ramp signal RPS exceeds the control signal CS. A signal composed of the high and low signals is a PWM signal PS for controlling switching of the FETs 2, 3 (see FIG. 2(c)), in which the rising timing of the high signal is constant, whereas the falling timing of the high signal varies depending on the control signal CS. The frequency of the PWM signal PS is the switching frequency (e.g., several hundreds of kilohertz to 1 MHz).

The voltage loop circuit 6a, which is constituted by the differential amplifier circuit 10, adder 11, ramp signal generator circuit 12, and comparator 13, generates the PWM signal PS so that a voltage which results from dividing the output voltage Vo becomes the target voltage Vref. As mentioned above, the gain-multiplied current detection signal PIS from the current loop circuit 6b is subtracted from the voltage detection signal VS, which corresponds to the output voltage Vo, and the rectangular wave signal RS (it will be explained later) from the gain optimizing circuit 6c is added to the voltage detection signal VS.

The current detection circuit 14 detects the current I, which flows through the inductor 4, immediately before the end of each period during which the low-side FET 3 is ON (that is, at intervals of one switching period). The current detection circuit 14 includes a capacitor, and accumulates (integrates) the current proportionate to the voltage (drain voltage) across the resistance Ron (i.e., resistance between the drain electrode and the source electrode) of the low-side FET 3 into the capacitor for a given time period. The current detection circuit 14 outputs a value corresponding to the average of the accumulated current, that is, the voltage across the capacitor, as a current detection signal IS immediately before the end of an ON time of the low-side FET 3. The value of the current detection signal IS is held until immediately before the end of the next ON time of the low-side FET 3, and is utilized for determining the falling timing of the next high signal of the PWM signal PS (and therefore, the pulse width of the PWM signal PS). Since the ON time of the high-side FET 2 is variable, the current is detected immediately before the end of the ON time of the low-side FET 3 such that the current can be detected reliably even when the ON time of the high-side FET 2 becomes longer.

The multiplier 15 receives the current detection signal IS from the current detection circuit 14 and a voltage signal, that is, a current control gain signal from the current control gain adjustment circuit 17. The voltage level (magnitude) of the current control gain signal is equal to a gain for use in controlling the current loop, that is, the current control gain Kamp. The output voltage PIS of the multiplier 15 is equal to a product of the current detection signal IS and the current control gain signal. In other words, the multiplier 15 multiplies the current detection signal IS by the current control gain Kamp to generate the output signal PIS. In the following, the signal PIS will be referred to as a gain-multiplied current detection signal.

The jagged line in FIG. 2(b) shows a voltage which results from multiplying the voltage proportionate to the current I flowing through the inductor 4 by the current control gain Kamp. The magnitude of the gain-multiplied current detection signal PIS is a value detected from the jagged voltage for each switching period. In FIG. 2(b), various values of the PIS signal are represented as circle and square symbols. The circle symbols appear in synchronization with the rising of the rectangular wave signal RS, and the square symbols appear in synchronization with the falling of the rectangular wave signal RS.

The current loop circuit 6b is configured of the current detection circuit 14, multiplier 15, adder 11, ramp signal generator circuit 12, and comparator 13, and performs a phase-lead compensation according to the current I which flows through the inductor 4. The phase-lead compensation is a method for compensating the phase delay generated by the LC filter circuit, which is configured of the inductor 4 and the capacitor 5, by leading the phase of the control signal CS. The current control gain Kamp used in the current loop circuit 6b is automatically adjusted by the gain optimizing circuit 6c so that the gain of the current loop circuit 6b becomes 1. If the gain of the current loop circuit 6b is 1, the phase delay is most appropriately compensated. This will be explained later in detail.

Figure 3:
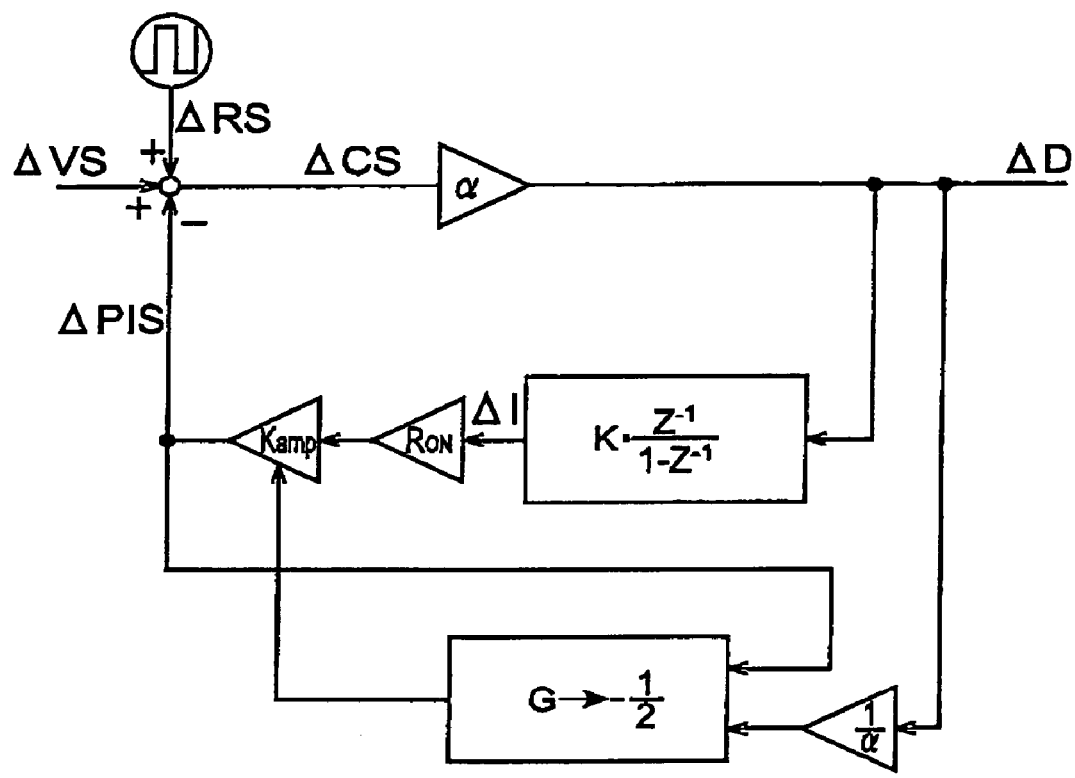
FIG. 3 is a block diagram showing a current loop for optimizing the gain in the DC/DC converter of FIG. 1.

With reference to FIGS. 3 to 9, the gain of the current loop circuit 6b and the current control gain Kamp will now be explained. The current loop circuit 6b can be expressed by the block diagram shown in FIG. 3. In FIG. 3, $\Delta VS$ represents the amount of change in the output (voltage detection signal VS) of the differential amplifier circuit 10, $\Delta RS$ the amount of change in the output (rectangular wave signal RS) of the rectangular wave generator circuit 16, $\Delta CS$ the amount of change in the output (control signal CS) of the adder 11, $\Delta D$ the amount of change in the duty ratio D of the output (PWM signal PS) of the comparator 13, $\Delta I$ the amount of change in the current I which flows through the inductor 4, and $\Delta PIS$ the amount of change in the output (gain-multiplied current detection signal PIS) of the multiplier 15. The duty ratio D of the PWM signal is a proportion of the time during which the high-side FET 2 is on in one period of the PWM signal PS, and reflects the pulse width in each period of the PWM signal PS. Since the current detection circuit 14 detects the current I flowing through the inductor 4 at intervals of the switching period, the current I in the previous switching period is reflected in the duty ratio D of the current switching period. Therefore, the current loop circuit 6b can be considered as feeding back the accumulation of the duty ratio D delayed by one switching period The transfer function Pcl of the current loop circuit 6b is represented by the following expression (1), which can be simplified as expression (2):

$$Pcl = \frac{\Delta D}{\Delta VS} = \frac{\alpha}{1 + \alpha \cdot ki \cdot k \cdot \frac{z^{-1}}{1-z^{-1}}} \qquad (1)$$

$$= \frac{\alpha \cdot (1 - z^{-1})}{1 - (1 - \alpha \cdot ki \cdot k) \cdot z^{-1}} \qquad (2)$$

where, $\alpha = \frac{1}{A}$, $ki = Kamp \cdot Ron$, and $k = \frac{Vi}{L \cdot Fsw}$ A is the amplitude of the ramp signal RPS, Kamp is the current control gain, Ron is the resistance of the low-side FET 3 when the FET 3 is turned on, Vi is the input voltage of the DC/DC converter 1, L is the inductance of the inductor 4, and Fsw is the switching frequency of the DC/DC converter 1. Multiplier coefficient α is the reciprocal of A, and is the proportion of the duty ratio D of the PWM signal PS to the magnitude of the control signal CS. The term α·ki·k is the gain of the current loop circuit 6b. Expression (2) is one representing the following IIR (Infinite Impulse Response) high-pass filter, thereby yielding a phase lead. The oscillation condition of the IIR high-pass filter is represented by the following expression (3):

$$|1-\alpha \cdot ki \cdot k| > 1 \qquad (3)$$

Figure 4:
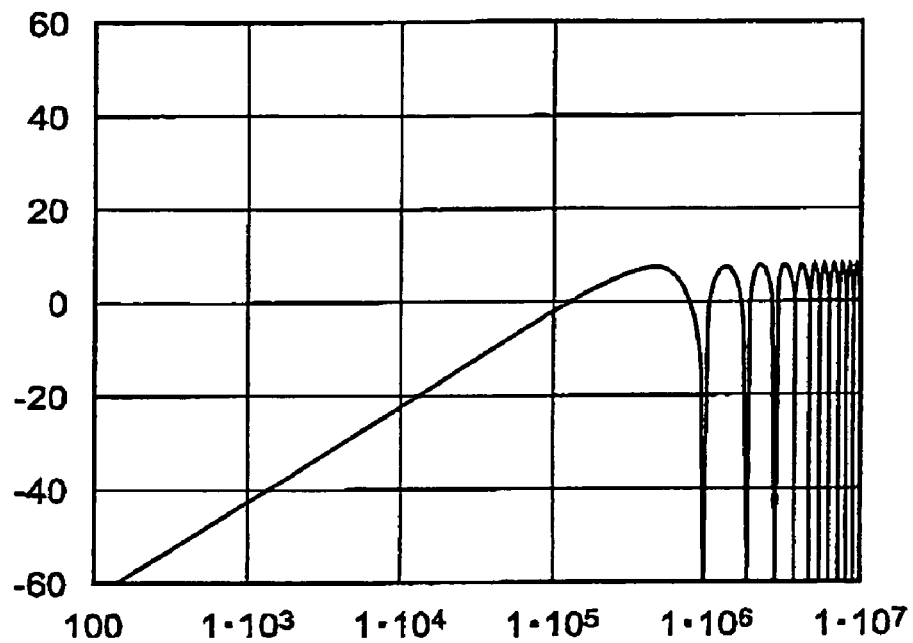
FIG. 4 is a view showing characteristics of a transfer function when the gain $\alpha\cdot ki\cdot k=0.5$ in the current loop shown in FIG. 3, where (a) represents a gain characteristic and (b) represents a phase characteristic.
Figure 4:
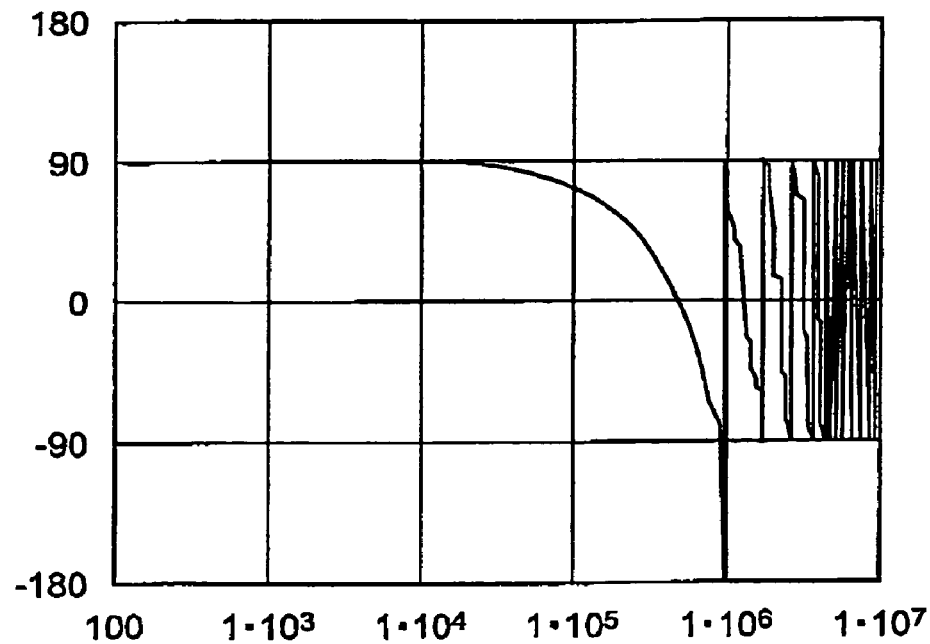
Figure 5:
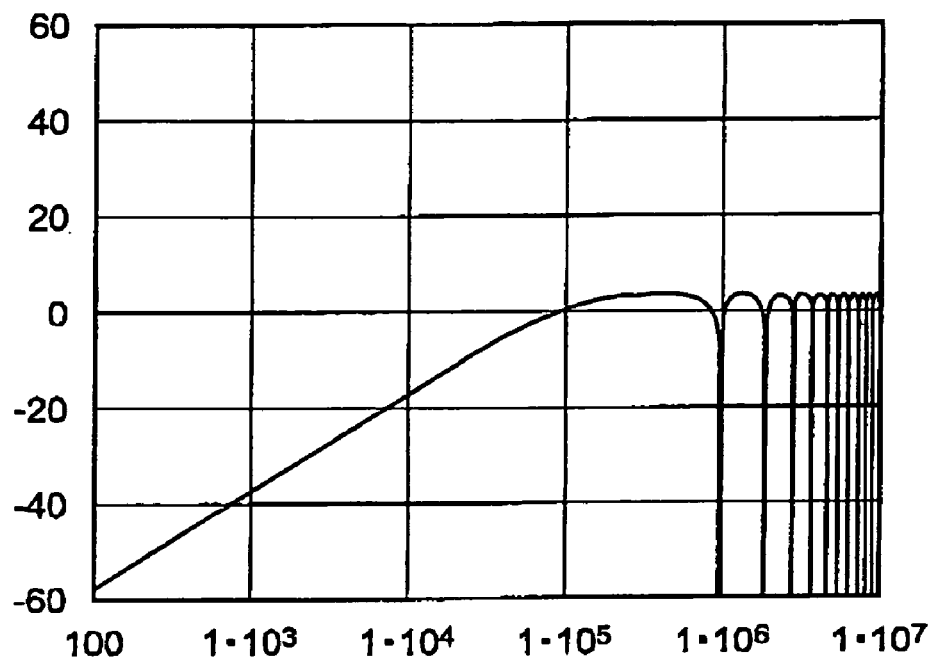
FIG. 5 is a view showing characteristics of a transfer function when the gain $\alpha\cdot ki\cdot k=0.5$ in the current loop shown in FIG. 3, where (a) represents a gain characteristic and (b) represents a phase characteristic.
Figure 5:
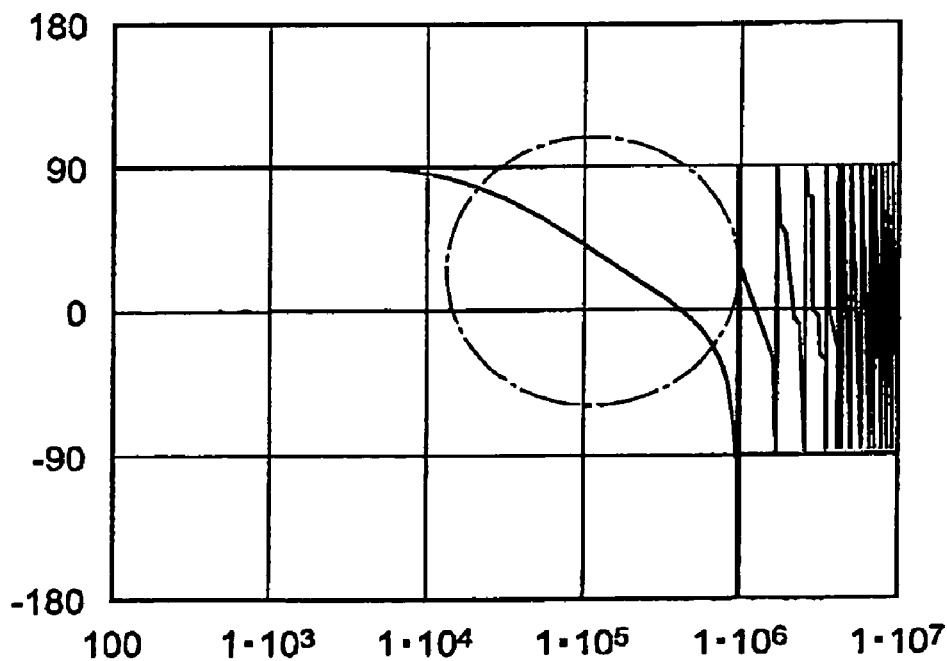
Figure 6:
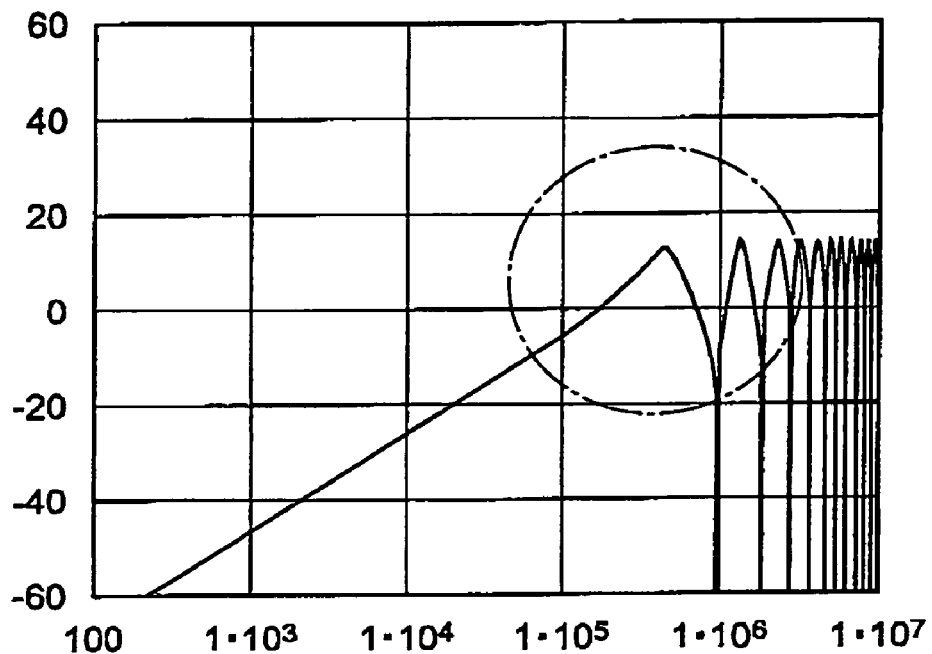
FIG. 6 is a view showing characteristics of a transfer function when the gain $\alpha\cdot ki\cdot k=1.5$ in the current loop shown in FIG. 3, where (a) represents a gain characteristic and (b) represents a phase characteristic.
Figure 6:
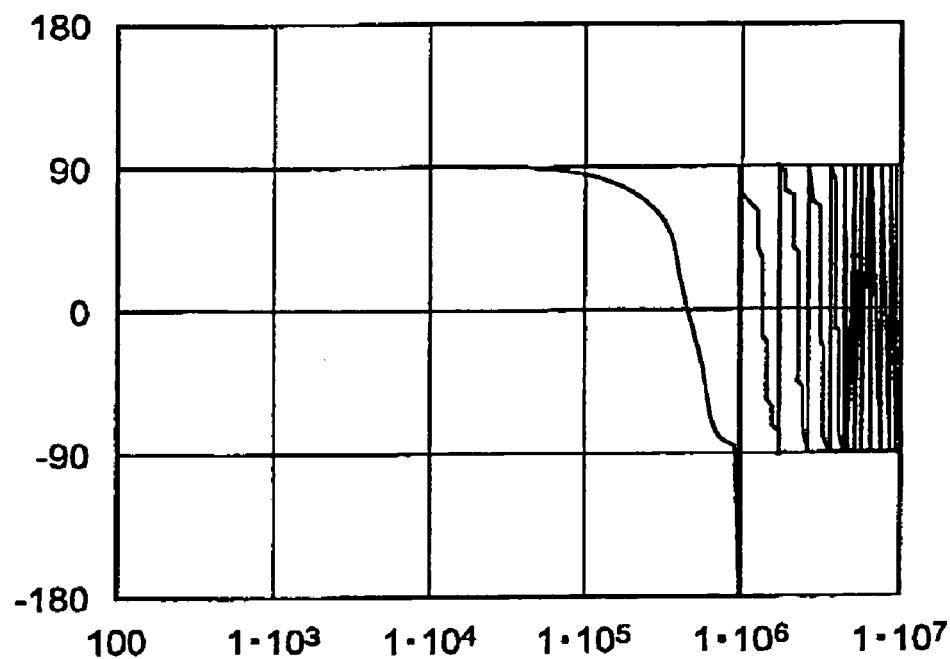

It is seen from expression (3) that the oscillation occurs when α·ki·k is greater than 2. When α·ki·k is 0, Pcl becomes α (a constant value) from expression (2), whereby the phase lead by the IIR high-pass filter is lost. FIGS. 4 to 6 show gain characteristics and phase characteristics of the transfer function Pcl in the current loop circuit 6b when α·ki·k is 1, 0.5, and 1.5, respectively. FIG. 4 is a graph showing characteristics of the transfer function when the gain α·ki·k=1 in the current loop shown in FIG. 3, where (a) represents a gain characteristic and (b) a phase characteristic. FIG. 5 is a graph showing characteristics of the transfer function when the gain α·ki·k=0.5 in the current loop shown in FIG. 3, where (a) represents a gain characteristic and (b) a phase characteristic. FIG. 6 is a graph showing characteristics of the transfer function when the gain α·ki·k=1.5 in the current loop shown in FIG. 3, where (a) represents a gain characteristic and (b) a phase characteristic. In each of the graphs showing the gain characteristics, the ordinate and abscissa indicate the gain [dB] and frequency [Hz], respectively. In each of the graphs showing the phase characteristics, the ordinate and abscissa indicate the phase [°] and frequency [Hz], respectively.

When α·ki·k is 1, as can be seen from FIG. 4, both the gain and phase characteristics have margins in a high-frequency region, so as to yield a sufficient phase-lead effect and stabilize the control system. When α·ki·k is 0.5, as can be seen from FIG. 5, the phase margin is in short in the high-frequency region (see the phase characteristic within the dash-single-dot circle in FIG. 5(b)) in the high-frequency region, thus lowering the phase-lead effect. When α·ki·k is 1.5, as can be seen from FIG. 6, the gain margin is in short in the high-frequency region (see the gain characteristic within the dash-single-dot circle in FIG. 6(a)) in the high-frequency region, so that the output voltage fluctuates greatly, thereby making the control system unstable. Therefore, in order for the current loop circuit 6b to exhibit the phase-lead effect and stabilize the control system (and prevent the oscillation from occurring), the gain α·ki·k of the current loop circuit 6b is required to satisfy at least the following expression (4):

$$0.5 < \alpha \cdot ki \cdot k < 1.5 \qquad (4)$$

Though at least the condition of expression (4) must be satisfied, the optimal value of the gain α·ki·k that achieves a sufficient phase-lead effect and stabilization of the control is 1. Therefore, the gain optimizing circuit 6c performs control for optimizing the gain α·ki·k of the current loop circuit 6b to 1. To this aim, the gain optimizing circuit 6c puts a rectangular wave having a frequency of half the switching frequency Fsw ("½ switching frequency" hereinafter) into ΔVS. When the rectangular wave is put into ΔVS, the pulse width of the PWM signal PS fluctuates (the duty ratio D also fluctuates), whereby a pulsation occurs in the current I flowing through the inductor 4 (and in the gain-multiplied current detection signal PIS) at ½ switching frequency. By utilizing the pulsation, the gain optimizing circuit 6c optimizes the gain α·ki·k of the current loop circuit 6b.

The transfer function G between ΔCS and ΔPIS is represented by the following expression (5). The rectangular wave with a frequency of half the switching frequency Fsw is put into ΔCS. Taking into consideration of the frequency, it is found that $z^{-1}$ in expression (5) is −1 as shown in expression (6). Therefore, when the rectangular wave with half the switching frequency is put into ΔCS, the transfer fiction becomes expression (7), which represents how ΔPIS changes when the rectangular wave with half the switching frequency is put into ΔCS.

$$G = \frac{\Delta PIS}{\Delta CS} = \alpha \cdot ki \cdot k \cdot \frac{z^{-1}}{1 - z^{-1}} = \alpha \cdot Kamp \cdot Ron \cdot k \cdot \frac{z^{-1}}{1 - z^{-1}} \qquad (5)$$

$$z^{-1} = -1 \qquad (6)$$

$$G = -\frac{1}{2} \cdot \alpha \cdot ki \cdot k = -\frac{1}{2} \cdot \alpha \cdot Kamp \cdot Ron \cdot k \qquad (7)$$

Figure 7:
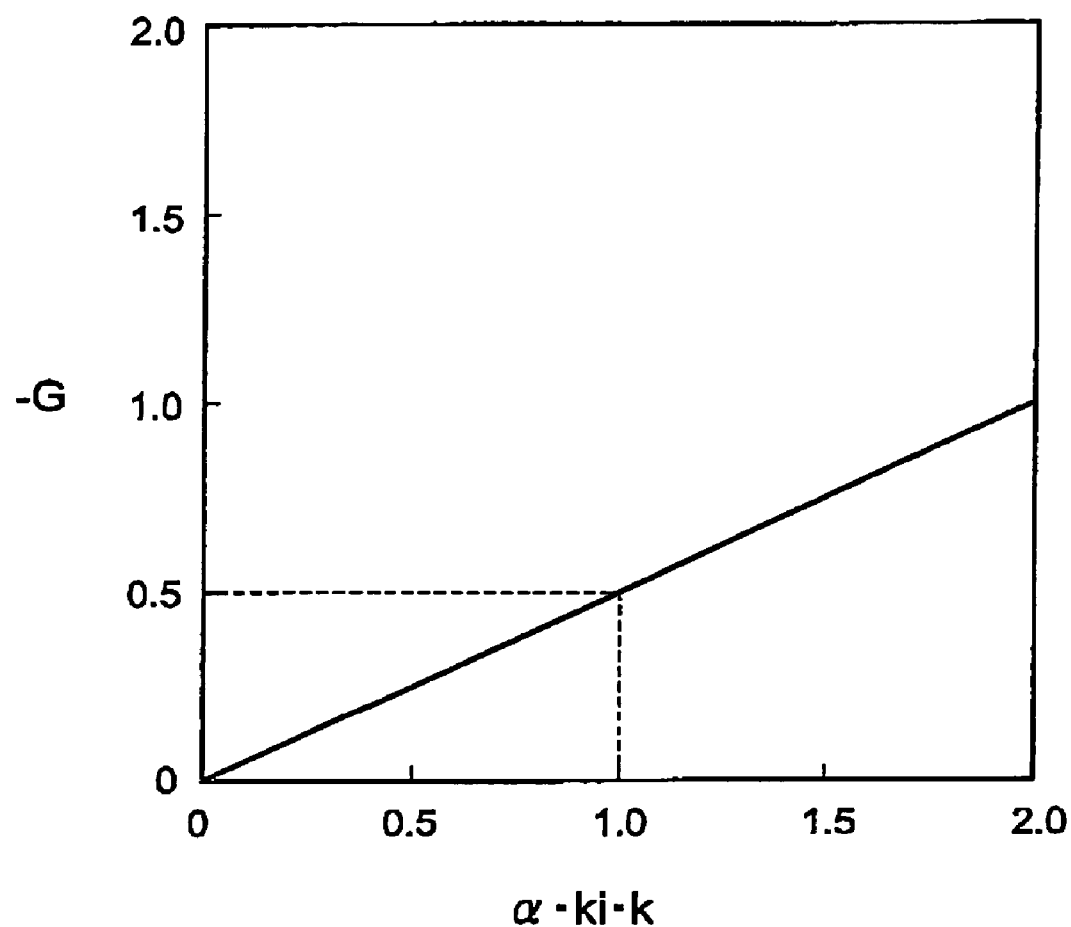
FIG. 7 is a graph showing the relationship between the gain α·ki·k in the current loop of FIG. 3 and a transfer function G.

FIG. 7 is a graph showing the relationship between the gain α·ki·k of the current loop circuit 6b and the transfer function G in expression (7). As can be seen from FIG. 7, in order to set the gain α·ki·k to 1, the transfer function G is required to be −½, as shown in the following expression (8). Expression (8) is deformed into expression (9). Since the multiplier coefficient α is the proportion of the duty ratio D to the control signal CS, ΔD is a value which results from multiplying ΔCS by the multiplier coefficient α, as shown in expression (10). Thus, from expressions (9) and (10), the relationship of expression (11) holds. This expression (11) is deformed into expression (12). Namely, when ΔPIS/ΔD, which pulsates at a frequency of half the switching frequency Fsw, is the minus value of the reciprocal of twice the multiplier coefficient α, the transfer function G becomes −½, whereby the gain α·ki·k of the current loop circuit 6b becomes 1.

$$G = \frac{\Delta PIS}{\Delta CS} = -\frac{1}{2} \qquad (8)$$

$$\Delta PIS = -\frac{1}{2} \cdot \Delta CS \qquad (9)$$

$$\Delta D = \alpha \cdot \Delta CS \qquad (10)$$

$$\Delta PIS = -\frac{1}{2\alpha} \cdot \Delta D \qquad (11)$$

$$\frac{\Delta PIS}{\Delta D} = -\frac{1}{2\alpha} \qquad (12)$$

For adjusting the current control gain Kamp so as to satisfy expression (12), the gain optimizing circuit 6c includes the adder 15, rectangular wave generator circuit 16, and current control gain adjustment circuit 17.

Figure 8:
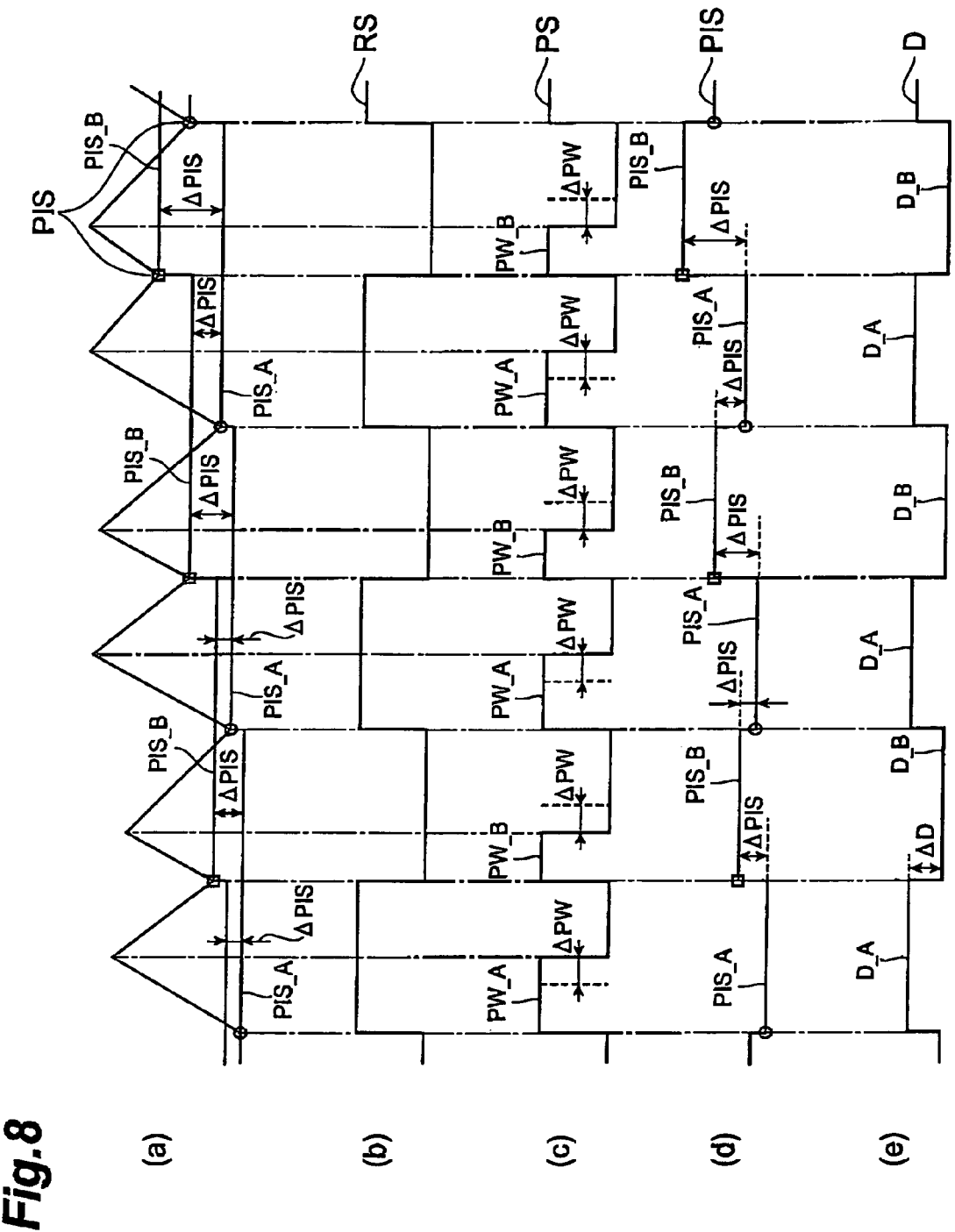
FIG. 8 is a timing chart for explaining the amount of change ΔPIS in the gain-multiplied current detection signal and the amount of change ΔD in the duty ratio of the PWM signal, where (a) shows the gain-multiplied current detection signal, (b) the rectangular wave signal, (c) the PWM signal, (d) the gain-multiplied current detection signal, and (e) the duty ratio of the PWM signal.

FIG. 8 is a timing chart for explaining the amount of change ΔPIS in the gain-multiplied current detection signal and the amount of change ΔD in the duty ratio of the PWM signal, where (a) shows a signal which results from multiplying a voltage proportionate to the inductor current I by the current control gain Kamp, (b) the rectangular wave signal RS, and (c) the PWM signal PS, (d) the gain-multiplied current detection signal PIS, and (e) the duty ratio D of the PWM signal. In FIG. 8(a), the values of the gain-multiplied current detection signal updated at intervals of the switching period are shown as circle and square symbols.

The rectangular wave generator circuit 16 generates the rectangular wave signal RS with a frequency of half the switching frequency Fsw (see FIG. 8(b)). This rectangular wave signal RS has a duty ratio of 50% and a voltage with a very small amplitude (e.g., an amplitude of 10 mV). The rectangular wave signal RS is put into the voltage detection signal VS, which is the output of the differential amplifier circuit 10, by the adder 11, and thus affects the falling timing of the ON time in the PWM signal PS. The ON time of the PWM signal PS becomes longer in the high level term of the rectangular wave signal RS, and shorter in the low level term (see FIGS. 8(b) and (c)). In FIG. 8(c), ΔPW represents the amount of change in the pulse width of the PWM signal due to the rectangular wave signal RS. As the pulse width of the PWM signal PS is fluctuated by the rectangular wave signal RS, the current I flowing through the inductor 4 varies, and the gain-multiplied current detection signal PIS pulsates at a frequency of half the switching frequency (see FIG. 8(d)). The signal PIS is a rectangular wave that alternately rises and falls at intervals of the switching period. Consequently, a difference occurs in the voltage of gain-multiplied current detection signal PIS between the low level term and the high level term of the rectangular wave signal RS (see FIGS. 8(a), (b) and (d)). This difference is ΔPIS, which indicates the amount of change in the gain-multiplied current detection signal PIS for each switching period.

ΔPW is the difference between the ON time of the PWM signal PS when the rectangular wave signal RS is high, i.e., PW_A, and the ON time of the PWM signal PS when RS is low, i.e., PW_B. ΔPW indicates the amount of change in the pulse width of the PWM signal PS for each switching period. As the pulse width varies, the duty ratio D of the PWM signal pulsates at a frequency of half the switching frequency (see FIGS. 8(b), (c) and (e)). Here, ΔD represents the amount of change in the duty ratio D for each switching period. Although ΔD is constant in FIG. 8(e), ΔD is not always constant because the duty ratio D can be gradually changed by PWM control in case where the target voltage for the output voltage Vo is changed, for example.

Figure 9:
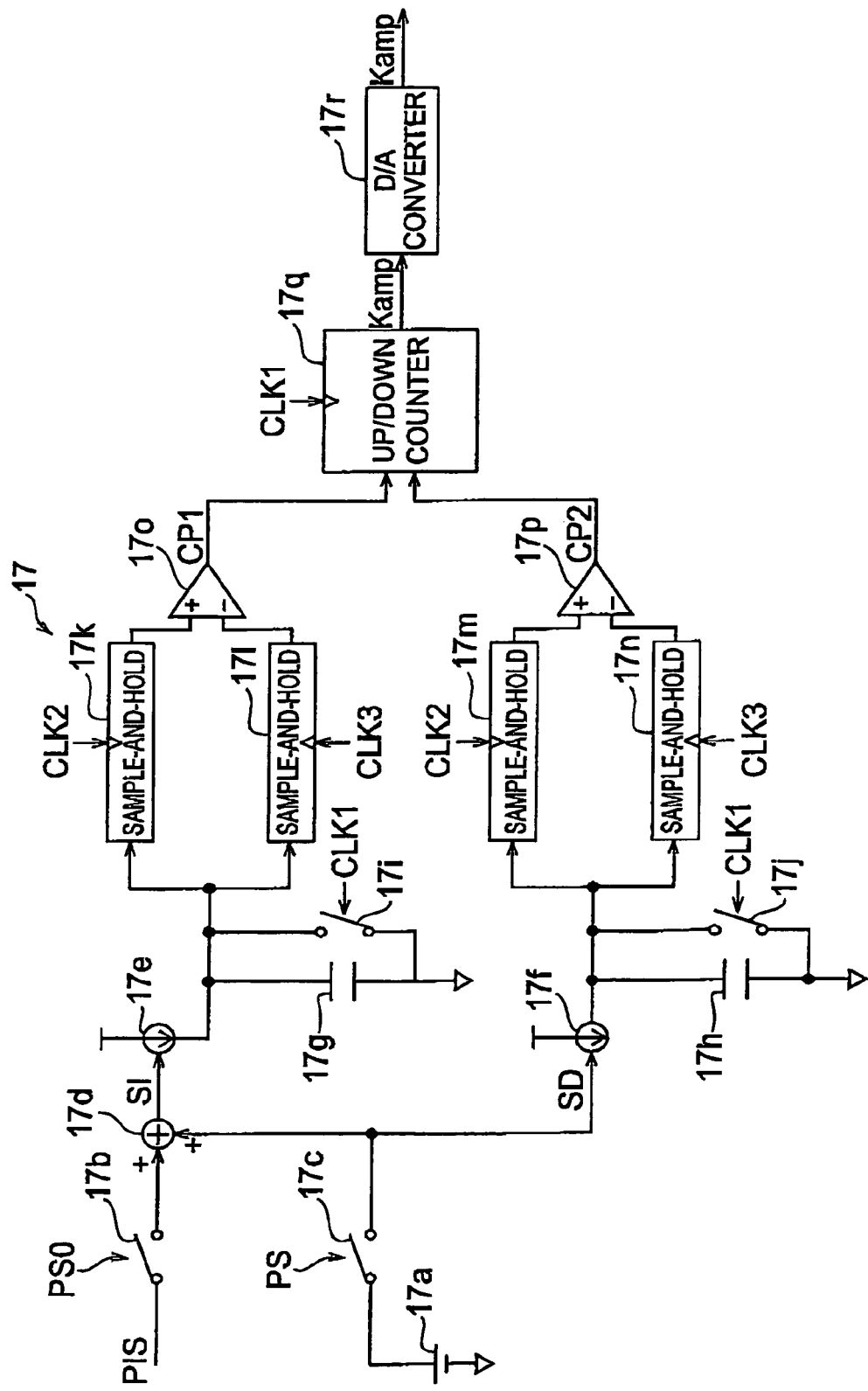
FIG. 9 is a detailed circuit diagram of the current control gain adjustment circuit.
Figure 10:
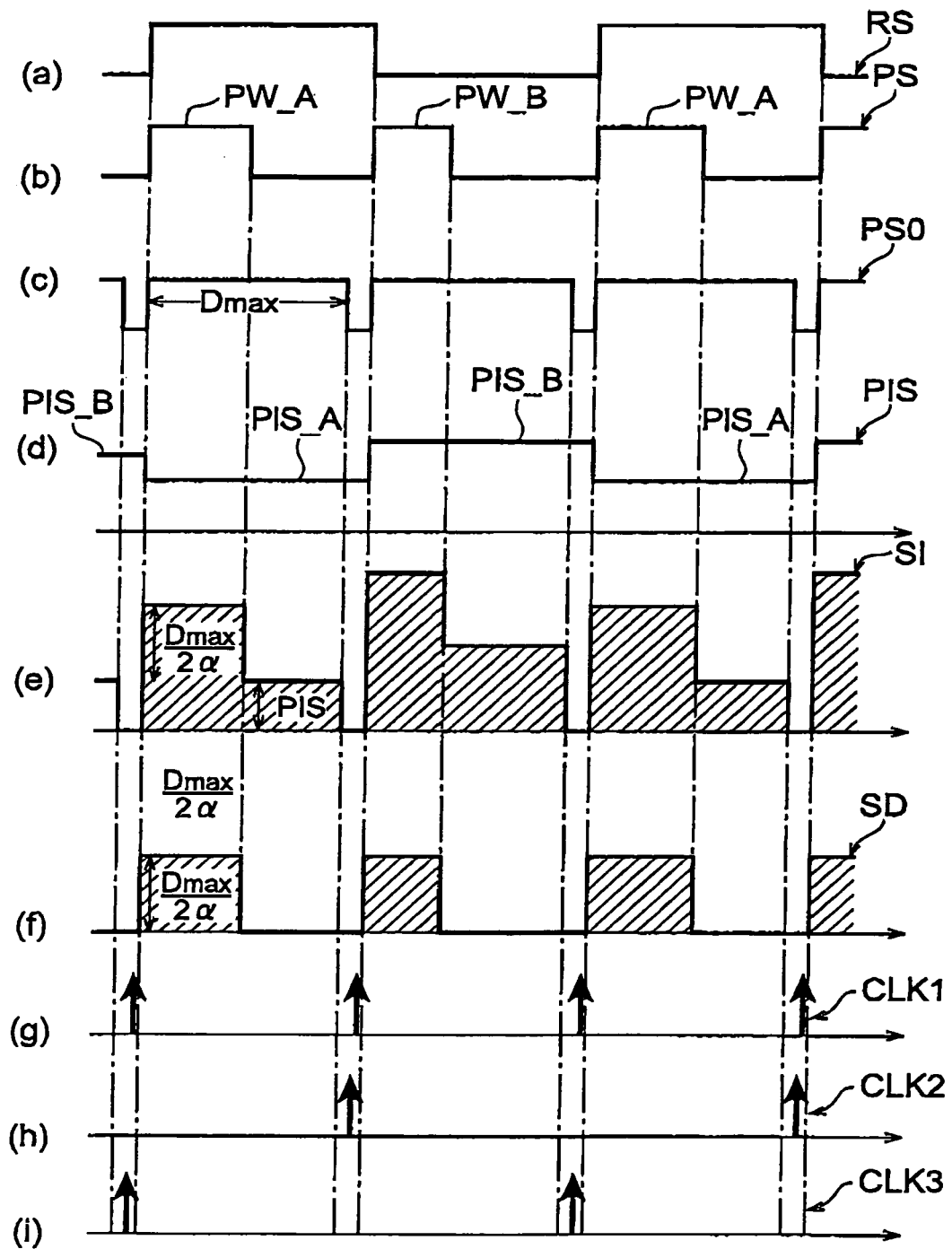
FIG. 10 is a timing chart for the current control gain adjustment circuit of FIG. 1, where (a) shows the rectangular wave signal, (b) the PWM signal, (c) a maximum PWM signal, (d) the gain-multiplied current detection signal, (e) a sum signal, (f) a duty ratio signal, (g) a first clock signal, (h) a second clock signal, and (i) a third clock signal.

Referring to FIGS. 9 and 10, the configuration and the operation of the current control gain adjustment circuit 17 will now be described. FIG. 9 is a detailed circuit diagram of the current control gain adjustment circuit 17. FIG. 10 is a timing chart for explaining the operation of the current control gain adjustment circuit 17, where (a) represents the rectangular wave signal, (b) the PWM signal, (c) a maximum PWM signal, (d) the gain-multiplied current detection signal, (e) a sum signal, (f) a duty ratio signal, (g) a first clock signal, (h) a second clock signal, and (i) a third clock signal.

The current control gain adjustment circuit 17 adjusts the current control gain Kamp so as to satisfy expression (12). ΔPIS in expression (12) corresponds to the difference between the average of voltage values (PIS_A) of the gain-multiplied current detection signal PIS when the rectangular wave signal RS is high and the average of voltage values (PIS_B) of the gain-multiplied current detection signal PIS when RS is low, as shown in the following expression (13) (see FIGS. 10(a) and (d)).

$$\Delta PIS = \overline{PIS\_A} - \overline{PIS\_B} \quad (13)$$

ΔD in expression (12) corresponds to the difference between the average of the duty ratio D_A of the PWM signal PS when the rectangular wave signal RS is high and the average of the duty ratio D_B of the PWM signal PS when RS is low, as shown in the following expression (14) (see FIGS. 10(a) and (b)). The duty ratio D_A reflects the ON time (PW_A) of the PWM signal PS when the rectangular wave signal RS is high, and the duty ratio D_B reflects the ON time (PW_B) of the PWM signal PS when RS is low.

$$\Delta D = \overline{D\_A} - \overline{D\_B} \quad (14)$$

When expressions (13) and (14) are put into expression (11), the relationship of expression (15) is obtained. Expression (15) is deformed into expression (16). Taking the average symbol (i.e., overline) out from expression (16) provides expression (17).

$$\overline{PIS\_A} - \overline{PIS\_B} = -\frac{1}{2\alpha}(\overline{D\_A} - \overline{D\_B}) \quad (15)$$

$$\frac{1}{2\alpha} \cdot \overline{D\_A} + \overline{PIS\_A} = \frac{1}{2\alpha} \cdot \overline{D\_B} + \overline{PIS\_B} \quad (16)$$

$$\frac{1}{2\alpha} \cdot D\_A + PIS\_A = \frac{1}{2\alpha} \cdot D\_B + PIS\_B \quad (17)$$

The current control gain adjustment circuit 17 adjusts the current control gain Kamp so as to satisfy expression (17). More specifically, the current control gain Kamp is adjusted so as to decrease the difference between the left-hand side and the right-hand side of expression (17) in each control loop, and repeating the control loop makes expression (16) satisfied.

FIG. 11 is a table showing the magnitude relationship between the left-hand and right-hand sides of expression (17), and up/down of the current control gain Kamp. First, as shown in a line 101 in FIG. 11, a case will be studied in which (½α)·D_A in the left-hand side of expression (17) is larger than (½α)·D_B in the right-hand side, and PIS_A in the left-hand side is smaller than PIS_B in the right-hand side, and thus the left-hand side equals the right-hand side. In this case, the current loop control is stable and the gain of the current loop is optimized, and therefore it is unnecessary to adjust the current control gain Kamp. However, as shown in a line 102 in FIG. 11, when (½α)·D_A is large and PIS_A is small in the left-hand side, and (½α)·D_B and PIS_B are small in the right-hand side, the left-hand side becomes greater than the right-hand side in expression (17). This means that the left-band side becomes greater than the right-hand side in expression (17) when PIS_B in the right-hand side decreases from one in the stable situation. To equalize the left-hand side to the right-hand side, it is necessary to increase the current control gain Kamp to make PIS_B sufficiently larger than PIS_A. On the other hand, as shown in a line 103 in FIG. 11, when (½α)·D_A is large and PIS_A is small in the left-hand side, and (½α)·D_B is small and PIS_B is extra large in the right-hand side, the right-hand side becomes greater than the left-hand side in expression (17). This means that the right-hand side becomes greater than the left-hand side in expression (17) when PIS_B in the right-hand side increases from one in the stable situation. To equalize the left-hand side to the right-hand side, it is necessary to decrease the current control gain Kamp to make PIS_B closer to PIS_A.

As shown in a line 104 in FIG. 11, a case will be studied in which $(\frac{1}{2}\alpha) \cdot D\_A$ in the left-hand side of expression (17) is smaller than $(\frac{1}{2}\alpha) \cdot D\_B$ in the right-hand side, and PIS_A in the left-hand side is larger than PIS_B in the right-hand side, and thus the left-hand side equals the right-hand side. Also in this case, the current loop control is stable and the gain of the current loop is optimized, and therefore it is unnecessary to adjust the current control gain Kamp. However, as shown in a line 105 in FIG. 11, when $(\frac{1}{2}\alpha) \cdot D\_A$ and PIS_A are small in the left-hand side, and $(\frac{1}{2}\alpha) \cdot D\_B$ is large and PIS_B is small in the right-hand side, the right-hand side becomes greater in expression (17). This means that the right-hand side becomes greater than the left-hand side in expression (17) when PIS_A in the left-hand side decreases from one in the stable situation. To equalize the left-hand side to the right-hand side, it is necessary to increase the current control gain Kamp to make PIS_A sufficiently larger than PIS_B. On the other hand, as shown in a line 106 in FIG. 11, when $(\frac{1}{2}\alpha) \cdot D\_A$ is small and PIS_A is extra large in the left-hand side, and $(\frac{1}{2}\alpha) \cdot D\_B$ is large and PIS_B is small in the right-hand side, the left-hand side becomes greater in expression (17). This means that the left-hand side becomes greater than the right-hand side in expression (17) when PIS_A in the left-hand side increases from one in the stable situation. To equalize the left-hand side to the right-hand side, it is necessary to decrease the current control gain Kamp to make PIS_A closer to PIS_B.

Therefore, the current control gain adjustment circuit 17 detects respective values corresponding to the left-hand and right-hand sides of expression (17) and compare them with each other. Further, the current control gain adjustment circuit 17 detects $(\frac{1}{2}\alpha) \cdot D\_A$ in the left-hand side and $(\frac{1}{2}\alpha) \cdot D\_B$ in the right-hand side in expression (17) and compares them with each other. In view of the results of these two comparisons, the current control gain adjustment circuit 17 increases/decreases the current control gain Kamp according to the relationship shown in FIG. 11. To achieve such an operation, the current control gain adjustment circuit 17 includes a DC voltage source 17*a*, switches 17*b* and 17*c*, an adder 17*d*, voltage control current sources 17*e* and 17*f*, capacitors 17*g* and 17*h*, reset switches 17*i* and 17*j*, sample-and-hold circuits 17*k*, 17*l*, 17*m* and 17*n*, comparators 17*o* and 17*p*, an up-down counter 17*q*, and a D/A converter 17*r*. The current control gain Kamp increases/decreases by increments of ±1 so that the left-hand side becomes closer to the right-hand side in expression (17), and therefore expression (16) which results from averaging expression (17) will be satisfied.

The adder 15 is connected to the switch 17*b*, so as to feed the gain-multiplied current detection signal PIS to the switch 17*b*. The switch 17*b* is turned on/off according to the maximum PWM signal PS0 (see FIG. 10(*c*)). The maximum PWM signal PS0 has the same frequency as that of the PWM signal PS, and becomes a high signal during the time period corresponding to the predetermined maximum duty ratio Dmax, and a low signal in the other time period. The switch 17*b* outputs the voltage of the gain-multiplied current detection signal PIS when the maximum PWM signal PS0 is high, and 0 V when PS0 is low.

The DC voltage source 17*a* is connected to the switch 17*c*. The DC voltage source 17*a* generates a voltage having a value which results from dividing the maximum duty ratio Dmax by $2\alpha$. The switch 17*c* is turned on/off according to the PWM signal PS (see FIG. 10(*b*)). The switch 17*c* outputs the voltage generated by the DC voltage source 17*a* when the maximum PWM signal PS0 is high, and 0 V when PS0 is low. The output signal of the switch 17*c* will be referred to as a duty ratio signal SD (see FIG. 10(*f*)). In the areas of hatched quadrangular parts in the duty ratio signal SD in FIG. 10(*f*), the respective areas in the high and low level term of the rectangular wave signal RS correspond to $(\frac{1}{2}\alpha) \cdot D\_A$ in the left-hand side and $(\frac{1}{2}\alpha) \cdot D\_B$ in the right-hand side in expression (17).

The switches 17*b* and 17*c* are connected to the adder 17*d*, so that the signal from the switch 17*b* and the signal (duty ratio signal SD) from the switch 17*c* are fed into the adder 17*d*. The adder 17*d* adds these two signals together, and outputs the resulting sum signal SI (see FIG. 10(*e*)). In the areas of hatched staircase parts in the sum signal SI, the respective areas in the high level term and the low level term of the rectangular wave signal RS correspond to PIS_A+$(\frac{1}{2}\alpha) \cdot D\_A$ in the left-hand side and PIS_B+$(\frac{1}{2}\alpha) \cdot D\_B$ in the right-hand side in expression (17).

Each of the voltage control current sources 17*e*, 17*f* is a current source generating a current proportionate to the voltage fed therein. The voltage control current source 17*e* receives the sum signal SI from the adder 17*d* and generates a current proportionate to the voltage of the sum signal SI. The voltage control current source 17*f* receives the duty ratio signal SD from the switch 17*c* and generates a current proportionate to the voltage of the duty ratio signal SD.

The capacitor 17*g* has one end connected to the voltage control current source 17*e* and the other end connected to the ground. The reset switch 17*i* is connected to the capacitor 17*g* in parallel. The reset switch 17*i* is turned on/off according to a first clock signal CLK1. Immediately before each time the PWM signal PS rises from the low signal to the high signal (and therefore, for each switching period), the first clock signal CLK1 outputs the high signal for an instant. Therefore, the reset switch 17*i* is turned on for an instant immediately before each time the PWM signal PS rises from the low signal to the high signal, and is turned off in the other time period. The capacitor 17*g* accumulates the current fed from the voltage control current source 17*e* when the reset switch 17*i* is turned off, and discharges thus accumulated current when the reset switch 17*i* is turned on. Consequently, the voltage of the end of the capacitor 17*g* becomes a value proportionate to the area of the hatched part in the sum signal SI in FIG. 10(*e*), and then becomes 0 V immediately before each time the PWM signal PS rises from the low signal to the high signal.

The capacitor 17*h* has one end connected to the voltage control current source 17*f* and the other end connected to the ground. The reset switch 17*j* is connected to the capacitor 17*h* in parallel. The reset switch 17*j* is also turned on/off according to the first clock signal CLK1. Therefore, the reset switch 17*j* is turned on for an instant immediately before each time the PWM signal PS rises from the low signal to the high signal, and is turned off in the other time period. The capacitor 17*h* accumulates the current fed from the voltage control current source 17*f* when the reset switch 17*j* is turned off, and discharges thus accumulated current when the reset switch 17*j* is turned on. Consequently, the voltage of the end of the capacitor 17*h* becomes a value proportional to the area of the hatched part in the duty ratio signal SD in FIG. 10(*f*), and then becomes 0 V immediately before each time the PWM signal PS rises from the low signal to the high signal.

The end of the capacitor 17g is connected to the sample-and-hold circuit 17k, so that the voltage at this end is fed into the sample-and-hold circuit 17k. A second clock signal CLK2 is also fed into the sample-and-hold circuit 17k (see FIG. 10(h)). The second clock signal CLK 2 includes high signals instantly rising immediately before each time the rectangular wave signal RS falls from the high signal to the low signal and immediately before each time the first clock signal CLK1 becomes the high signal (that is, high signals rising at intervals of twice the switching period). When fed with one of the high signals of the second clock signal CLK2, the sample-and-hold circuit 17k samples the voltage at the end of the capacitor 17g and holds this voltage value until the next high signal of the second clock signal CLK2 is fed thereto. Therefore, the sample-and-hold circuit 17k holds a voltage proportionate to the area of hatched part of the sum signal SI in the high level term of the rectangular wave signal RS (see FIGS. 10(a) and (e)). The held value corresponds to the left-hand side of expression (17).

The end of the capacitor 17g is connected to the sample-and-hold circuit 17l, so that the voltage at this end is fed into the sample-and-hold circuit 17l. A third clock signal CLK3 is also fed into the sample-and-hold circuit 17l (see FIG. 10(i)). The third clock signal CLK3 includes high signals instantly rising immediately before each time the rectangular wave signal RS rises from the low signal to the high signal and immediately before each time the first clock signal CLK1 becomes the high signal (that is, high signals rising at intervals of twice the switching period). When fed with one of the high signals of the third clock signal CLK3, the sample-and-hold circuit 17l samples the voltage at the end of the capacitor 17g and holds this voltage value until the next high signal of the third clock signal CLK3 is fed thereto. Therefore, the sample-and-hold circuit 17l holds a voltage proportionate to the area of hatched part of the sum signal SI in the low level term of the rectangular wave signal RS (see FIGS. 10(a) and (e)). The held value corresponds to the right-hand side of expression (17).

The end of the capacitor 17h is connected to the sample-and-hold circuit 17m, so that the voltage at this end is fed into the sample-and-hold circuit 17m. The second clock signal CLK2 is also fed into the sample-and-hold circuit 17m (see FIG. 10(b)). When fed with one of the high signals of the second clock signal CLK2, the sample-and-hold circuit 17m samples the voltage at the end of the capacitor 17h and holds this voltage value until the next high signal of the second clock signal CLK2 is fed thereto. Therefore, the sample-and-hold circuit 17m holds a voltage proportionate to the area of hatched part of the duty ratio signal SD in the high level term of the rectangular wave signal RS (see FIGS. 10(a) and (f)). The held value corresponds to $(\frac{1}{2}\alpha) \cdot D\_A$ in the left-hand side of expression (17).

The end of the capacitor 17h is connected to the sample-and-hold circuit 17n, so that the voltage at this end is fed into the sample-and-hold circuit 17n. The third clock signal CLK3 is also fed into the sample-and-hold circuit 17n (see FIG. 10(i)). When fed with one of the high signals of the third clock signal CLK3, the sample-and-hold circuit 17n samples the voltage at the end of the capacitor 17h and holds this voltage value until the next high signal of the third clock signal CLK3 is fed thereto. Therefore, the sample-and-hold circuit 17n holds a voltage proportionate to the area of hatched part of the duty ratio signal SD in the low level term of the rectangular wave signal RS (see FIGS. 10(a) and (f)). The held value corresponds to $(\frac{1}{2}\alpha) \cdot D\_B$ in the right-hand side of expression (17).

The comparator 17o has a non-inverted input terminal for receiving the value held by the sample-and-hold circuit 17k, and an inverted input terminal for receiving the value held by the sample-and-hold circuit 17l. The comparator 17o compares the value held by the sample-and-hold circuit 17k with the value held by the sample-and-hold circuit 17l, and outputs a high signal when the value held by the sample-and-hold circuit 17k is greater than the value held by the sample-and-hold circuit 17l, and a low signal when the value held by the sample-and-hold circuit 17l is greater than the value held by the sample-and-hold circuit 17k. This high or low signal is a first comparison signal CP1 indicating which of the left-hand side or right-hand side of expression (17) is greater than the other. Namely, the first comparison signal CP1 becomes the high signal when the left-hand side is greater than the right-hand side in expression (17), and becomes the low signal when the right-hand side is greater than the left-hand side.

The comparator 17p has a non-inverted input terminal for receiving the value held by the sample-and-hold circuit 17m, and an inverted input terminal for receiving the value held by the sample-and-hold circuit 17n. The comparator 17p compares the value held by the sample-and-hold circuit 17m with the value held by the sample-and-hold circuit 17n, and outputs a high signal when the value held by the sample-and-bold circuit 17m is greater than the value held by the sample-and-hold circuit 17n, and a low signal when the value held by the sample-and-hold circuit 17n is greater than the value held by the sample-and-hold circuit 17m. This high or low signal is a second comparison signal CP2 indicating which of $(\frac{1}{2}\alpha) \cdot D\_A$ in the left-hand side or $(\frac{1}{2}\alpha) \cdot D\_B$ in the right-hand side of expression (17) is greater than the other. Namely, the second comparison signal CP2 becomes the high signal when $(\frac{1}{2}\alpha) \cdot D\_A$ in the left-hand side is greater than $(\frac{1}{2}\alpha) \cdot D\_B$ in the right-hand side, and becomes the low signal when $(\frac{1}{2}\alpha) \cdot D\_B$ is greater than $(\frac{1}{2}\alpha) \cdot D\_A$.

The up/down counter 17q receives the first comparison signal CP1 from the comparator 17o and the second comparison signal CP2 from the comparator 17p. The first clock signal CLK1 is also fed into the up/down counter 17q. Each time receiving the high signal of the first clock signal CLK1, the up/down counter 17q increases/decreases the current control gain Kamp depending on whether the first comparison signal CP1 is the high or low signal and whether the second comparison signal CP2 is the high or low signal according to the relationship shown in FIG. 11. More specifically, the up/down counter 17q increases the current control gain Kamp when both of the first and second comparison signals CP1 and CP2 are the high or low signals, and decreases the current control gain Kamp when the first comparison signal CP1 is the high signal and the second comparison signals CP2 is the low signal, or when CP1 is the low signal and CP2 is the high signal. A relatively small value is set as the initial value of the current control gain Kamp. Therefore, the current control gain Kamp usually becomes greater while moving up and down as the gain $\alpha \cdot ki \cdot k$ of the current loop circuit 6b approaches 1 (see FIGS. 2(e) and (f)). The current control gain Kamp is a digital value which increases/decreases by increments of 1 each time the first clock signal CLK1 rises.

Kamp is not increased over the maximum or decreased under the minimum of the output of the up/down counter 17q. In case where the output of the up/down counter 17q is of 9-bit, for example, if the output is 0, it is held as it is even when FIG. 11 indicates "down." On the other hand, if the output of the up/down counter 17q is 511, it is held as it is even when FIG. 11 indicates "up."

The D/A converter 17r receives the current control gain Kamp (e.g., 0 to 511) of the digital value from the up/down counter 17q, and converts this digital value into an analog value of current control gain Kamp (e.g., 89 mV to 600 mV). Then, the D/A converter 17r outputs the analog value of current control gain Kamp to the multiplier 15. In this case, 89 mV and 600 mV become the minimum and maximum of the output, respectively. Thus the output voltage of the D/A converter 17r is fed to the analog multiplier 15 as the current control gain signal. The output voltage of the multiplier 15, that is, gain-multiplied current detection signal PIS, is fed to the current control gain adjustment circuit 17 and used for regulating the current control gain Kamp.

Thus, the gain optimizing circuit 6c, in which the multiplier 15 and the current control gain adjustment circuit 17 form a loop, automatically adjusts the current control gain Kamp so that the relationship of expression (12) holds, thereby optimizing the gain $\alpha \cdot ki \cdot k$ of the current loop circuit 6b to 1. When the relationship of expression (12) holds, the transfer function G becomes $-\frac{1}{2}$, whereby the gain $\alpha \cdot ki \cdot k$ of the current loop circuit 6b converges at 1. Hence, if the resistance Ron of the FET varies due to variations of devices or change in temperature, the gain of the current loop is automatically optimized. As a result, it is possible to obtain a sufficient phase-lead effect by the current loop control and stabilize the control system.

The gain optimizing circuit 6c has a very simple configuration because of the frequency of the rectangular wave signal RS that equals half the switching frequency. Further, the current control gain adjustment circuit 17 is configured so as to adjust the current control gain Kamp by the digital value and thus does not require a capacitor having a large capacity and the like, whereby the controller IC 6 does not need external parts. Hence, it is possible to manufacture the controller IC 6 as a compact one.

With reference to FIGS. 1 and 9, operations of the DC/DC converter 1 and the controller IC 6 will now be explained. For explaining the operations in the controller IC 6, the timing charts of FIGS. 2 and 10 will be referred to.

When receiving the input voltage Vi, the DC/DC converter 1 alternately turns on/off the FETs 2 and 3 according to the PWM signal PS from the controller IC 6. Further, in the DC/DC converter 1, the smoothing circuit 25 configured of the inductor 4 and the capacitor 5 averages the input voltage Vi that emits as pulses in the ON times of the high-side FET 2, and produces the output voltage Vo. The DC/DC converter 1 feeds back the output voltage Vo to the controller IC 6. The DC/DC converter 1 also feeds back the current I flowing through the inductor 4 to the controller IC 6.

When the output voltage Vo is fed back the controller IC 6 differentially amplifies the output voltage Vo and target voltage Vref. Immediately before each time the low-side FET 3 is turned off from the ON state, the controller IC 6 detects the current I flowing through the inductor 4, based on the voltage across the resistance Ron of the low-side FET 3, and multiplies thus detected current detection signal IS by the current control gain Kamp. Then, the controller IC 6 adds the rectangular wave signal RS to the differentially amplified voltage detection signal VS and subtracts the gain-multiplied current detection signal PIS therefrom (see FIGS. 2(a), (b), and (d)), thereby generating the control signal CS. Further, the controller IC 6 compares the control signal CS with the ramp signal RPS, and generates the PWM signal PS which is high when the ramp signal RPS is no greater than the control signal CS and low when RPS exceeds CS (see FIG. 2(c)). Thus, the controller IC 6 generates the PWM signal PS while taking account of the gain-multiplied current detection signal PIS under the current loop control, thereby attaining a phase-lead effect and enabling a high-speed response.

The current control gain adjustment circuit 17 receives the gain-multiplied current detection signal PIS and the PWM signal PS, and generates, using the current voltage source 17a, a voltage which results from dividing a voltage corresponding to the maximum duty ratio Dmax by $2\alpha$. Then, the sum signal SI is generated, which is composed of the component of the left-hand side PIS_A+($\frac{1}{2}\alpha$)·D_A and the component of the right-hand side PIS_B+($\frac{1}{2}\alpha$)·D_B in expression (17) (see FIG. 10(e)). The current control gain adjustment circuit 17 separates PIS_A+($\frac{1}{2}\alpha$)·D_A and PIS_B+($\frac{1}{2}\alpha$)·D_B from the sum signal SI, and thes two components are held as digital voltage values by the sample-and-hold circuits 17k and 17l. On the other hand, the current control gain adjustment circuit 17 generates the duty ratio signal SD composed of the component of ($\frac{1}{2}\alpha$)·D_A in the left-hand side and the component of ($\frac{1}{2}\alpha$)·D_B in the right-hand side in expression (17) (see FIG. 10(f)). Further, the current control gain adjustment circuit 17 separates the ($\frac{1}{2}\alpha$)·D_A and ($\frac{1}{2}\alpha$)·D_B from the duty ratio signal SD, and these two components are held as digital voltage values by the sample-and-hold circuits 17m and 17n.

Then, the current control gain adjustment circuit 17 compares, using the comparator 17o, the component (voltage value) of PIS_A+($\frac{1}{2}\alpha$)·D_A and the component (voltage value) of PIS_B+($\frac{1}{2}\alpha$)·D_B and generates the first comparison signal CP1 which is a high or low signal. This comparison is performed between the hatched staircase areas in FIG. 10(e), and corresponds to comparing the area obtained when the rectangular wave signal RS is high with the area obtained when RS is low. Also, the current control gain adjustment circuit 17 compares, using the comparator 17p, the component (voltage value) of ($\frac{1}{2}\alpha$)·D_A with the component (voltage value) of ($\frac{1}{2}\alpha$)·D_B, and generates the second comparison signal CP2 which is a high or low signal. This comparison is performed between the hatched quadrangular areas in FIG. 10(f), and corresponds to comparing the area obtained when the rectangular wave signal RS is high with the area obtained when RS is low.

Further, the current control gain adjustment circuit 17 increases/decreases, using the up/down counter 17q, the current control gain Kamp according to the first comparison signal CP1 from the comparator 17o and the second comparison signal CP2 from the comparator 17p. Then, the current control gain adjustment circuit 17 converts the digital current control gain Kamp into the analog current control gain Kamp, and feeds the latter as the current control gain signal to the multiplier 15.

The current control gain adjustment circuit 17 detects $\Delta$PIS which is the amount of change in the gain-multiplied current detection signal PIS for each switching period, and $\Delta$D which is the amount of change in the duty ratio D of the PWM signal for each switching period, and adjusts the current control gain Kamp so that $\Delta$PIS/$\Delta$D becomes $-\frac{1}{2}\alpha$ (that is, expression (12) is satisfied). Since the rectangular wave signal RS with a frequency of half the switching frequency is put into the voltage detection signal VS, the pulse width (and duty ratio) of the PWM signal PS oscillates at half the switching frequency, thereby changing the current I which flows though the inductor 4 (and the gain-multiplied current detection signal PIS). If the gain-multiplied current detection signal PIS does not change much while the duty ratio changes between he high and low level terms of the rectangular wave signal RS, the current control gain Kamp is smaller than its ideal value, and therefore the current control gain adjustment circuit 17 increases the current control gain Kamp. If the gain-multiplied current detection signal PIS is changed more than the duty ratio between the high and low level terms of the rectangular wave signal RS, on the other hand, the current control gain Kamp is larger than the ideal value, and therefore the current control gain adjustment circuit 17 will decrease the current control gain Kamp.

Thus, the current control gain Kamp is gradually adjusted (see FIG. 2(*e*)), and the transfer function G from the control signal CS, which includes the rectangular wave signal RS, to the gain-multiplied current detection signal PIS approaches $-\frac{1}{2}$. As can be seen from the graph of FIG. 7, the gain $\alpha \cdot ki \cdot k$ of the current loop circuit 6*b* approaches 1 as the transfer function G approaches $-\frac{1}{2}$ (see FIG. 11(*f*)).

Later, the current control gain Kamp becomes an ideal value (see FIG. 2(*e*)), and the gain $\alpha \cdot ki \cdot k$ of the current loop circuit 6*b* converges at 1 (see FIG. 2(*f*)). The transfer function G converges at $-\frac{1}{2}$, and the transfer function from the PWM signal PS to the gain-multiplied current detection signal PIS converges at $-\frac{1}{2}\alpha$ (the transfer function from the control signal CS to the gain-multiplied current detection signal PIS converges at $-\frac{1}{2}$). As a result, the phase-lead effect due to the current loop circuit 6*b* is exhibited sufficiently, and the control system is stabilized. Even when the resistance Ron of the low-side FET 3 has variation as a device or fluctuation with temperature, the current control gain Kamp is adjusted so as to decrease the change in the resistance Ron, so that the gain $\alpha \cdot ki \cdot k$ of the current loop circuit 6*b* does not fluctuate, whereby the control system does not become unstable.

It is possible for the controller IC 6 to optimize the gain $\alpha \cdot ki \cdot k$ of the current loop circuit 6*b* to 1 by putting the rectangular wave signal RS with a frequency of half the switching frequency into the voltage detection signal VS and automatically adjusting the current control gain Kamp so that $\Delta PIS/\Delta D$ becomes $\frac{1}{2}\alpha$. Consequently, even when the ON resistance Ron of the low-side FET 3 fluctuates, the control system is stabilized, so as to yield a sufficient phase-lead effect and enable a high-speed response. Since the control system is stable, the output voltage Vo is restrained from fluctuating, and does not oscillate as a matter of course.

Furthermore, since the controller IC regulates $\Delta PIS/\Delta D$ so as to set it to $-\frac{1}{2}\alpha$ using $\Delta PIS$ and $\Delta D$ that alternately rise and fill at intervals of the switching period, stable current loop control is available even when the load current alternately increases and decreases at intervals of the switching period due to operations at the load L and the like. There are cases where operations are periodically stopped at the load L in order to prevent an increase in temperature and so forth, and the frequency of the stop may be half the switching frequency, and the time period during which the operation is stopped may be equal to the switching period. In this case, the load current oscillates at half the switching frequency.

Since highly accurate current detection is possible by the gain-multiplied current detection signal PIS, the controller IC 6 can detect an overcurrent regardless of Rons of the FETs 2 and 3. Consequently, it is possible to appropriately protect the DC—DC converter 1 from the overcurrent.

Second Embodiment

A switching power supply in accordance with the present embodiment has the configuration which results from replacing the current control gain adjustment circuit 17 in the DC—DC converter 1 of the first embodiment with a current control gain adjustment circuit 18. The switching power supply of this embodiment has otherwise the same configuration as the DC—DC converter 1.

Figure 12:
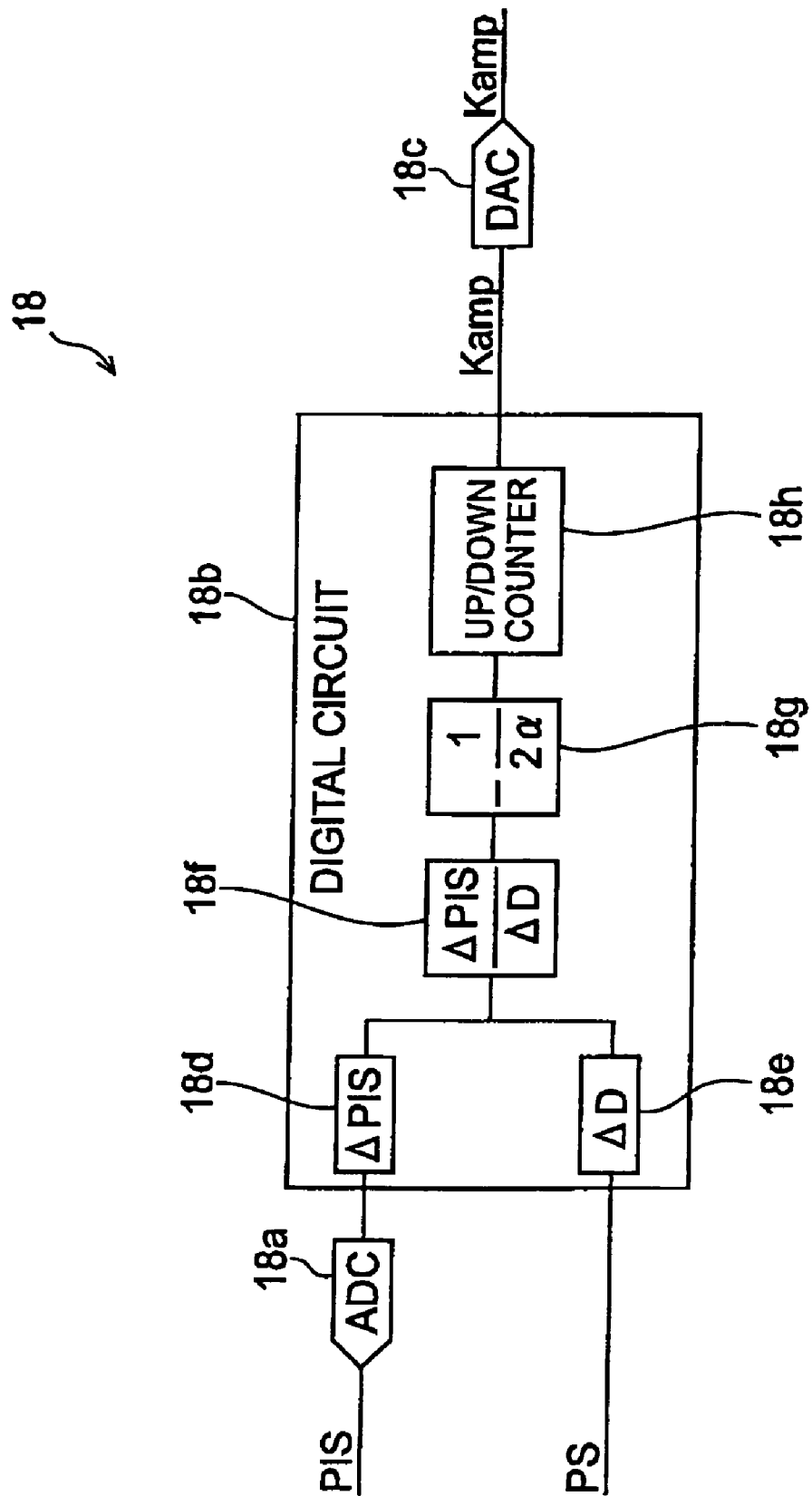
FIG. 12 is a view showing the configuration of a current control gain adjustment circuit used in the second embodiment.

FIG. 12 is a view showing the configuration of the current control gain adjustment circuit 18, which adjusts the current control gain Kamp according to the gain-multiplied current detection signal PIS and PWM signal PS. The current control gain adjustment circuit 18 has an log-to-digital (A/D) converter 18*a*, a digital calculator circuit 18*b*, and a digital-to-analog (D/A) converter 18*c*. This embodiment adjusts the current control gain Kamp by directly calculating the left-hand side of expression (12) mentioned above and comparing the calculated left-hand side with the right-hand side.

The digital calculator circuit 18 includes a $\Delta PIS$ detection circuit 18*d*, a $\Delta D$ detection circuit 18*e*, a divider circuit 18*f*, a comparator circuit 18*g*, and an up/down counter 18*h*. Each of these circuits 18*d*-18*h* is a digital circuit. The $\Delta PIS$ detection circuit 18*d* receives the gain-multiplied current detection signal PIS from the multiplier 15 to determine $\Delta PIS$ mentioned above. The $\Delta D$ detection circuit 18*e* receives the PWM signal PS from the comparator 13 to determine $\Delta D$ mentioned above. The divider circuit 18*f* receives $\Delta PIS$ and $\Delta D$ from the circuits 18*d* and 18*e* to calculate $\Delta PIS/\Delta D$. The comparator circuit 18*g* compares the calculated $\Delta PIS/\Delta D$ with $-\frac{1}{2}\alpha$, and outputs a high signal when $\Delta PIS/\Delta D$ is $-\frac{1}{2}\alpha$ or less, and a low signal when $\Delta PIS/\Delta D$ exceeds $-\frac{1}{2}\alpha$. The up/down counter 18*h* increases or decreases the current control gain Kamp according to the output signal of the comparator circuit 18*g* so that $\Delta PIS/\Delta D$ becomes closer to $-\frac{1}{2}\alpha$. The D/A converter 18*c* converts thus determined Kamp of the digital value into an analog value, and feeds the analog value to the multiplier 15 as the current control gain signal.

Thus, the current control gain adjustment circuit 18 gradually adjusts the current control gain Kamp so that the above expression (12) is satisfied, and accordingly the gain $\alpha \cdot ki \cdot k$ of the current loop circuit 6*b* comes close to 1, which is the optimal value. Consequently, this embodiment provides the same advantageous effects as the first embodiment does.

Third Embodiment

Figure 13:
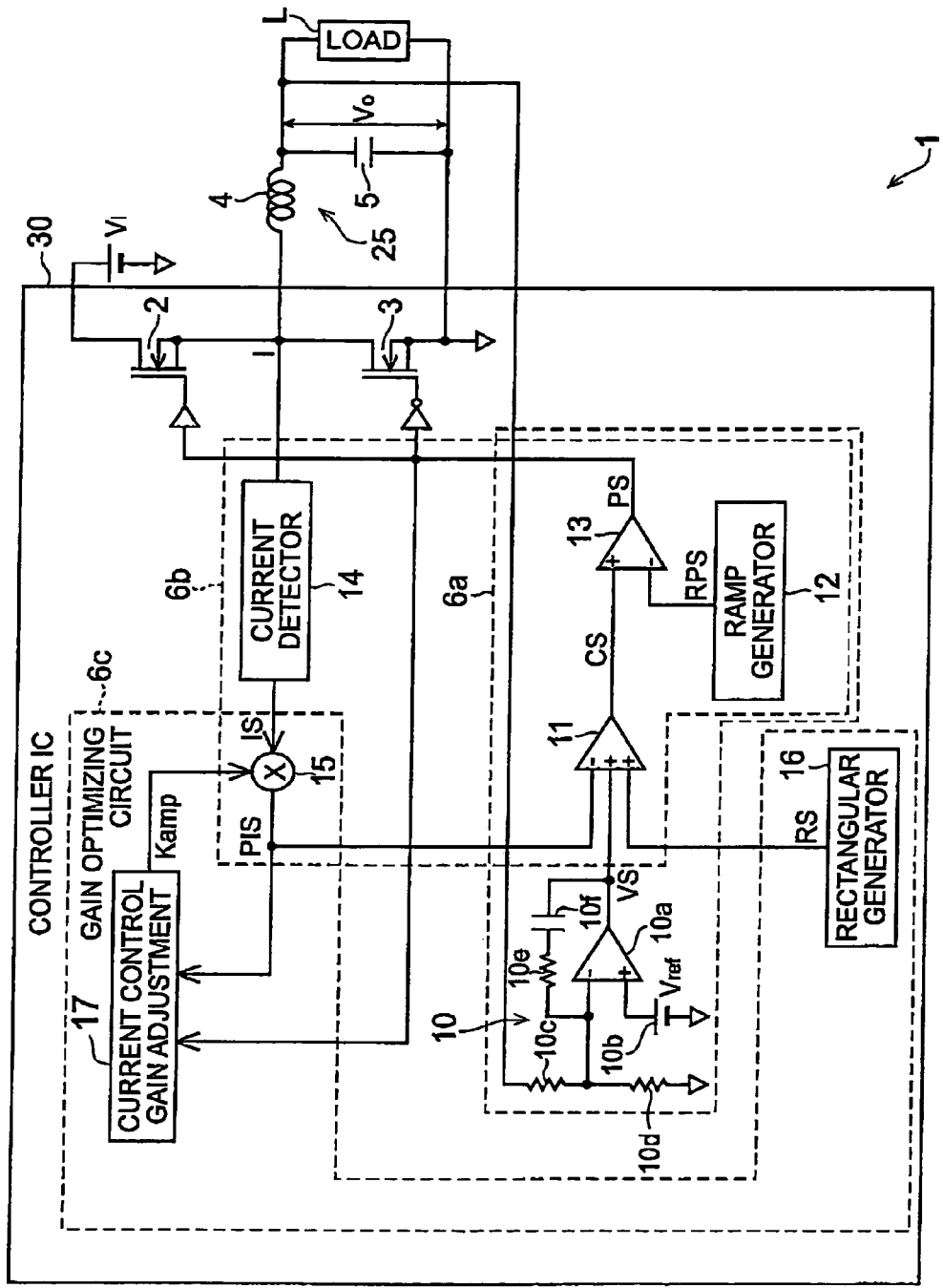
FIG. 13 is a view showing the configuration of a DC—DC converter in accordance with the third embodiment.

FIG. 13 is a view showing the configuration of a DC—DC converter in accordance with the present embodiment This embodiment differs from the first embodiment in that a controller IC 30 in this embodiment includes the FETs 2 and 3 which are switching devices, whereas the controller IC 6 in the first embodiment does not include the FETs 2 and 3. The DC—DC converter of this embodiment has the same components as the first embodiment does. Therefore, this embodiment provides the same advantageous effects as the first embodiment does.

Since the FETs 2 and 3 are provided in the controller IC 30, the DC—DC converter 1, which is a switching power supply, can be obtained by simply connecting the controller IC 30 to the smoothing circuit 25. Namely, using the controller IC 30 makes it easy to manufacture the DC—DC converter 1.

Though an embodiment of the present invention is explained in the foregoing, the present invention can be embodied in various modes without being restricted to the above-mentioned embodiment.

For example, when a control device in accordance with the present invention is configured of a digital circuit (hardware), individual means in the control device may be realized by programs (software) built in microcomputers and the like. The programs realizing these means may be circulated by storage media such as CD-ROM, by distribution through the Internet and the like, or as control device built in computers The invention is applied to a DC—DC converter in the above embodiments; however, it is possible to apply the invention to AC-DC converters or DC-AC converters. The invention is applied to a non-insulated, buck type converter without transformers in the above embodiments; however, it is possible to apply the invention to insulated converters with transformers, or boost or buck-boost type converters.

Since the rising timing of the ON signal for the high-side FET is fixed in the above embodiments, the inductor current is detected immediately before the end of each ON time of the low-side FET. However, if the rising timing of the ON signal for the low-side FET is fixed, it is necessary to change the detecting timing for the inductor current, to the timing immediately after the start of each ON time of the low-side FET, for example.

In the above embodiments, the current control gain is adjusted so as to satisfy expression (12), by directly using the duty ratio of the driving pulse signal. However, the current control gain may be adjusted so as to satisfy expression (12), by using a different parameter that reflects the duty ratio of the driving pulse signal, such as the pulse width of the driving pulse signal, instead of directly using the duty ratio.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A control device for controlling a switching power supply having an output voltage, the switching power supply including a switching device which switches at a predetermined switching period and a predetermined switching frequency to produce an output, and a smoothing circuit for smoothing the output of the switching device, the smoothing circuit including an inductor connected to the switching device, the control device comprising:
    a voltage detector for detecting the output voltage of the switching power supply to generate a voltage detection signal corresponding to the output voltage;
    a current detector for detecting a current flowing through the inductor for each switching period to generate a current detection signal corresponding to the detected current;
    a rectangular wave generator for generating a rectangular wave signal having a frequency of half the switching frequency;
    a multiplier for multiplying the current detection signal by a current control gain to generate a gain-multiplied current detection signal;
    a calculator for adding the rectangular wave signal and subtracting the gain-multiplied current detection signal to/from the voltage detection signal to generate a control signal having a magnitude;
    a driving signal generator for generating a driving pulse signal having a duty ratio corresponding to the magnitude of the control signal and supplying the driving pulse signal to the switching device to drive the switching device; the driving pulse signal being generated so that $\Delta D/\Delta CS$ equals $\alpha$, where $\Delta D$ represents an amount of change in the duty ratio for each switching period, and $\Delta CS$ an amount of change in the control signal for each switching period, and $\alpha$ is a constant, and
    a gain adjustor for adjusting the current control gain according to the gain-multiplied current detection signal and the duty ratio, the current control gain being adjusted so that $\Delta PIS/\Delta D = -\frac{1}{2}\alpha$ is satisfied, where $\Delta PIS$ represents an amount of change in the gain-multiplied current detection signal for each switching period.

2. A control device according to claim 1, wherein the switching device has a resistance when being turned on, and
    wherein the current detector detects the current flowing through the inductor by detecting a voltage across the resistance.

3. A control device according to claim 1, wherein the gain-multiplied current detection signal alternately rises and falls at intervals of the switching period, and
    wherein the duty ratio decreases in synchronization with the rising of the gain-multiplied current detection signal, and increases in synchronization with the falling of the gain-multiplied current detection signal.

4. A control device according to claim 1, wherein the driving signal generator includes a ramp signal generator for generating a ramp signal which oscillates at a predetermined amplitude and the switching frequency, and
    wherein the constant cc equals a reciprocal of the amplitude of the ramp signal.

5. A control device according to claim 1, wherein the rectangular wave signal has a high level term and a low level term, and
    wherein the gain adjuster includes:
    a first calculator for calculating $(\frac{1}{2}\alpha) \cdot D\_A + PIS\_A$, where $D\_A$ represents the duty ratio in the high level term of the rectangular wave signal, and $PIS\_A$ a magnitude of the gain-multiplied current detection signal in the high level term of the rectangular wave signal, to generate a first result signal indicating a result of the calculation;
    a second calculator for calculating $(\frac{1}{2}\alpha) \cdot D\_B + PIS\_B$, where $D\_B$ represents the duty ratio in the low level term of the rectangular wave signal, and $PIS\_B$ a magnitude of the gain-multiplied current detection signal in the low level term of the rectangular wave signal, to generate a second result signal indicating a result of the calculation;
    a first comparator for comparing the first result signal with the second result signal to generate a first comparison signal indicating a result of the comparison;
    a duty ratio detector for detecting $D\_A$ and $D\_B$ from the driving pulse signal;
    a second comparator for comparing the detected $D\_A$ with the detected $D\_B$ to generate a second comparison signal indicating a result of the comparison; and
    a gain determining circuit for increasing or decreasing the current control gain, depending on the first and second comparison signals, to determine the current control gain.

6. A control device according to claim 1, wherein the gain-multiplied current detection signal is an analog signal, and
wherein the gain adjuster includes:
an analog-to-digital converter for converting the gain-multiplied current detection signal into a digital gain-multiplied signal;
a first digital detector for detecting $\Delta$PIS from the digital gain-multiplied signal;
a second digital detector for detecting $\Delta$D from the driving pulse signal;
a digital divider for calculating $\Delta$PIS/$\Delta$D from the detected $\Delta$PIS and the detected $\Delta$D;
a digital comparator for comparing the calculated $\Delta$PIS/$\Delta$D with $-\frac{1}{2}\alpha$ to generate an output signal indicating a result of the comparison;
a digital gain determining circuit for increasing or decreasing the current control gain according to the output signal of the digital comparator so that $\Delta$PIS/$\Delta$D becomes closer to $-\frac{1}{2}\alpha$, and generating a digital gain signal indicating the increased or decreased current control gain; and
a digital-to-analog converter for converting the digital gain signal into an analog gain signal, and
wherein the multiplier receives the analog gain signal and the current detection signal to generate an output signal corresponding to a product of the analog gain signal and the current detection signal as the gain-multiplied current detection signal.

7. A control device adapted to be connected to a smoothing circuit to configure a switching power supply having an output voltage, the smoothing circuit including an inductor, the control device comprising:
a switching device which switches at a predetermined switching period and a predetermined switching frequency, the switching device being adapted to be connected to the inductor;
a voltage detector for detecting the output voltage of the switching power supply to generate a voltage detection signal corresponding to the output voltage;
a current detector for detecting a current flowing through the inductor for each switching period to generate a current detection signal corresponding to the detected current;
a rectangular wave generator for generating a rectangular wave signal having a frequency of half the switching frequency;
a multiplier for multiplying the current detection signal by a current control gain to generate a gain-multiplied current detection signal;
a calculator for adding the rectangular wave signal and subtracting the gain-multiplied current detection signal to/from the voltage detection signal to generate a control signal having a magnitude;
a driving signal generator for generating a driving pulse signal having a duty ratio corresponding to the magnitude of the control signal and supplying the driving pulse signal to the switching device to drive the switching device; the driving pulse signal being generated so that $\Delta$D/$\Delta$CS equals $\alpha$, where $\Delta$D represents an amount of change in the duty ratio for each switching period, and $\Delta$CS an amount of change in the control signal for each switching period, and $\alpha$ is a constant, and
a gain adjustor for adjusting the current control gain according to the gain-multiplied current detection signal and the duty ratio, the current control gain being adjusted so that $\Delta$PIS/$\Delta$D=$-\frac{1}{2}\alpha$ is satisfied, where $\Delta$PIS represents an amount of change in the gain-multiplied current detection signal for each switching period.

8. A control device according to claim 7, wherein the switching device has a resistance when being turned on, and
wherein the current detector detects the current flowing through the inductor by detecting a voltage across the resistance.

9. A control device according to claim 7, wherein the gain-multiplied current detection signal alternately rises and falls at intervals of the switching period, and
wherein the duty ratio decreases in synchronization with the rising of the gain-multiplied current detection signal, and increases in synchronization with the falling of the gain-multiplied current detection signal.

10. A control device according to claim 7, wherein the driving signal generator includes a ramp signal generator for generating a ramp signal which oscillates at a predetermined amplitude and the switching frequency, and
wherein the constant $\alpha$ equals a reciprocal of the amplitude of the ramp signal.

11. A control device according to claim 7, wherein the rectangular wave signal has a high level term and a low level term, and
wherein the gain adjuster includes:
a first calculator for calculating $(\frac{1}{2}\alpha)\cdot$D_A+PIS_A, where D_A represents the duty ratio in the high level term of the rectangular wave signal, and PIS_A a magnitude of the gain-multiplied current detection signal in the high level term of the rectangular wave signal, to generate a first result signal indicating a result of the calculation;
a second calculator for calculating $(\frac{1}{2}\alpha)\cdot$D_B+PIS_B, where D_B represents the duty ratio in the low level term of the rectangular wave signal, and PIS_B a magnitude of the gain-multiplied current detection signal in the low level term of the rectangular wave signal, to generate a second result signal indicating a result of the calculation;
a first comparator for comparing the first result signal with the second result signal to generate a first comparison signal indicating a result of the comparison;
a duty ratio detector for detecting D_A and D_B from the driving pulse signal;
a second comparator for comparing the detected D_A with the detected D_B to generate a second comparison signal indicating a result of the comparison; and
a gain determining circuit for increasing or decreasing the current control gain, depending on the first and second comparison signals, to determine the current control gain.

12. A control device according to claim 7, wherein the gain-multiplied current detection signal is an analog signal, and
wherein the gain adjuster includes:
an analog-to-digital converter for converting the gain-multiplied current detection signal into a digital gain-multiplied signal;
a first digital detector for detecting $\Delta$PIS from the digital gain-multiplied signal;
a second digital detector for detecting $\Delta$D from the driving pulse signal;
a digital divider for calculating $\Delta$PIS/$\Delta$D from the detected $\Delta$PIS and the detected $\Delta$D;
a digital comparator for comparing the calculated $\Delta$PIS/$\Delta$D with $-\frac{1}{2}\alpha$ to generate an output signal indicating a result of the comparison;

a digital gain determining circuit for increasing or decreasing the current control gain according to the output signal of the digital comparator so that $\Delta PIS/\Delta D$ becomes closer to $-\frac{1}{2}\alpha$, and generating a digital gain signal indicating the increased or decreased current control gain; and a digital-to-analog converter for converting the digital gain signal into an analog gain signal, and wherein the multiplier receives the analog gain signal and the current detection signal to generate an output signal corresponding to a product of the analog gain signal and the current detection signal as the gain-multiplied current detection signal.

13. A switching power supply having an output voltage, the switching power supply comprising:

a switching device which switches at a predetermined switching period and a predetermined switching frequency to produce an output;

a smoothing circuit for smoothing the output of the switching device to generate the output voltage of the switching power supply, the smoothing circuit including an inductor connected to the switching device; and a control circuit including:

a voltage detector for detecting the output voltage of the switching power supply to generate a voltage detection signal corresponding to the output voltage;

a current detector for detecting a current flowing through the inductor for each switching period to generate a current detection signal corresponding to the detected current;

a rectangular wave generator for generating a rectangular wave signal having a frequency of half the switching frequency;

a multiplier for multiplying the current detection signal by a current control gain to generate a gain-multiplied current detection signal;

a calculator for adding the rectangular wave signal and subtracting the gain-multiplied current detection signal to/from the voltage detection signal to generate a control signal having a magnitude;

a driving signal generator for generating a driving pulse signal having a duty ratio corresponding to the magnitude of the control signal and supplying the driving pulse signal to the switching device to drive the switching device; the driving pulse signal being generated so that $\Delta D/\Delta CS$ equals $\alpha$, where $\Delta D$ represents an amount of change in the duty ratio for each switching period, and $\Delta CS$ an amount of change in the control signal for each switching period, and $\alpha$ is a constant, and a gain adjustor for adjusting the current control gain according to the gain-multiplied current detection signal and the duty ratio, the current control gain being adjusted so that $\Delta PIS/\Delta D=-\frac{1}{2}\alpha$ is satisfied, where $\Delta PIS$ represents an amount of change in the gain-multiplied current detection signal for each switching period.

* * * * *